(12) United States Patent
Mae

(10) Patent No.: US 8,705,945 B2
(45) Date of Patent: Apr. 22, 2014

(54) INFORMATION PROCESSING APPARATUS, INFORMATION PROCESSING METHOD, AND PROGRAM

(75) Inventor: Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 13/088,679

(22) Filed: Apr. 18, 2011

(65) Prior Publication Data

US 2011/0299837 A1 Dec. 8, 2011

(30) Foreign Application Priority Data

Jun. 7, 2010 (JP) ................................. 2010-129650

(51) Int. Cl.
*H04N 5/92* (2006.01)
*H04N 9/80* (2006.01)

(52) U.S. Cl.
USPC .......................................... 386/326; 386/248

(58) Field of Classification Search
USPC .................. 386/220–234, 239–248
See application file for complete search history.

(56) References Cited

U.S. PATENT DOCUMENTS

| | | | | |
|---|---|---|---|---|
| 7,787,741 B2 * | 8/2010 | Greenwood | ................... | 386/232 |
| 2004/0223740 A1 * | 11/2004 | Itoi | ................. | 386/95 |
| 2006/0140088 A1 * | 6/2006 | Yoshida | ..................... | 369/47.12 |
| 2008/0059398 A1 * | 3/2008 | Tsutsui | ............................ | 707/1 |
| 2008/0215620 A1 * | 9/2008 | Folgner et al. | ............. | 707/104.1 |
| 2009/0047002 A1 * | 2/2009 | Morimoto et al. | ............ | 386/125 |
| 2009/0109333 A1 * | 4/2009 | Fushimi | ....................... | 348/441 |
| 2009/0110376 A1 * | 4/2009 | Matoba | ........................ | 386/131 |

FOREIGN PATENT DOCUMENTS

JP 2007-295070 11/2007

OTHER PUBLICATIONS

U.S. Appl. No. 13/088,643, filed Apr. 18, 2011, Mae.

* cited by examiner

*Primary Examiner* — Hung Dang
(74) *Attorney, Agent, or Firm* — Sony Corporation

(57) ABSTRACT

An information processing apparatus includes: a priority content setting unit setting at least one of a plurality of contents managed in accordance with at least one of a plurality of recording formats as a priority content based on selection of a user or a predetermined rule; and a control unit performing control to change the recording format for managing the priority content so that the priority content is managed in accordance with a specific recording format among the plurality of recording formats, when an operation input of the user is receivable and the operation input is an operation input associated with a specific operation.

16 Claims, 24 Drawing Sheets

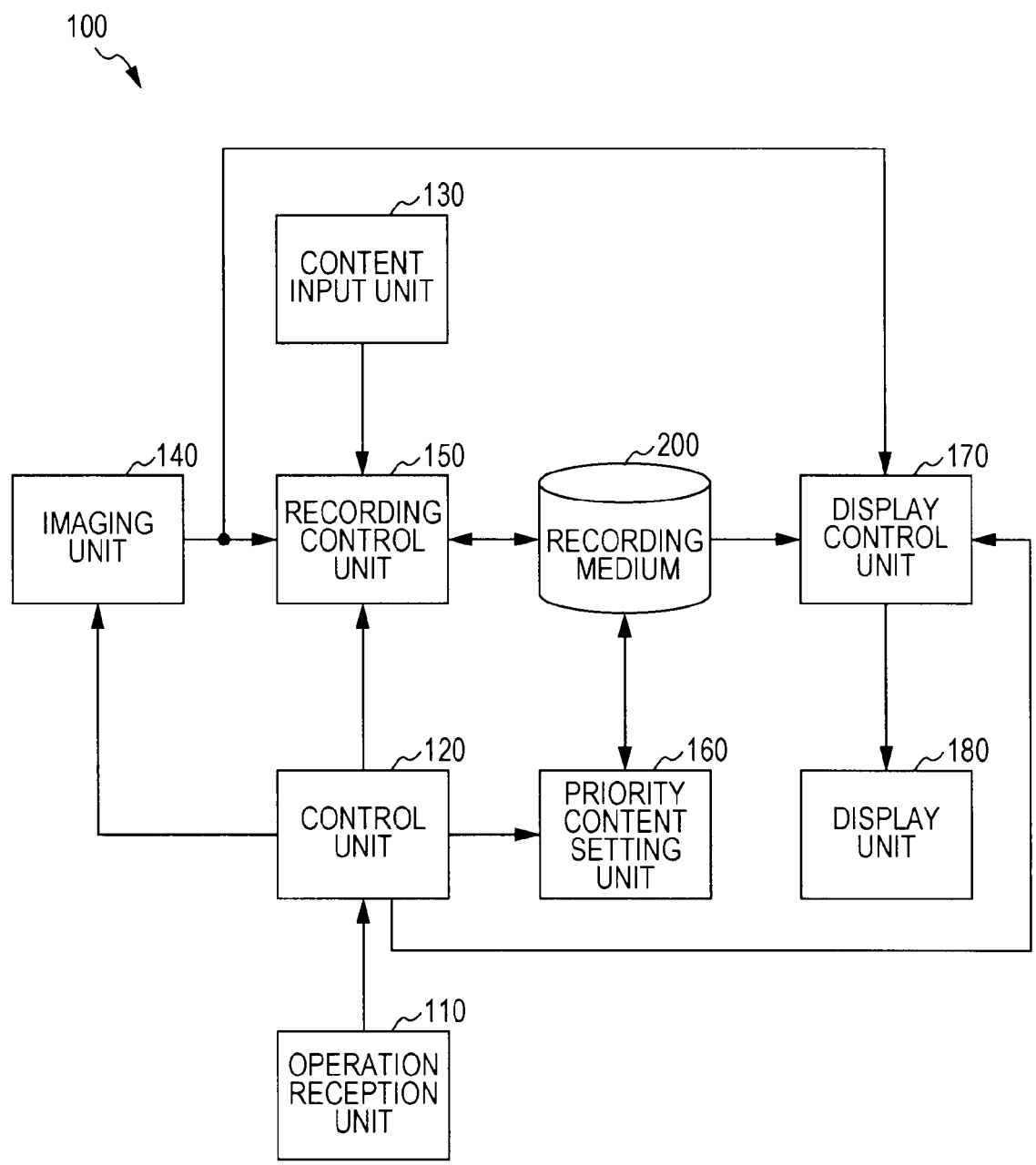

FIG. 3A

| MANAGEMENT SCHEME ~201 | MANAGEMENT SPECIFICATION ~202 | STREAM MANAGEMENT UPPER LIMIT VALUE ~203 | REPRODUCER COMPATIBILITY ~204 |
|---|---|---|---|
| MANAGEMENT SCHEME A | AVC VIDEO CONTENT OF MPEG-TS IS MANAGED IN ACCORDANCE WITH AVCHD STANDARD | 4000 | HIGH |
| MANAGEMENT SCHEME B | AVC VIDEO CONTENTS OF MPEG-TS AS EXTENSION IMAGE FILE OF DCF STANDARD AND CLIP INFORMATION FILE OF AVCHD STANDARD AS OTHER DCF FILES ARE GROUPED AND MANAGED AS DCF OBJECT | 8999100 | LOW |

FIG. 3B

```
<file>
  <name>"AVC00101.CPI"</name>
  <location>"/AVCHD/BDMV/CLIPINF/00001.CPI"</location>
</file>
<file>
  <name>"AVC00101.MTS"</name>
  <location>"/AVCHD/BDMV/STREAM/00001.MTS"</location>
</file>
```

FIG. 4A

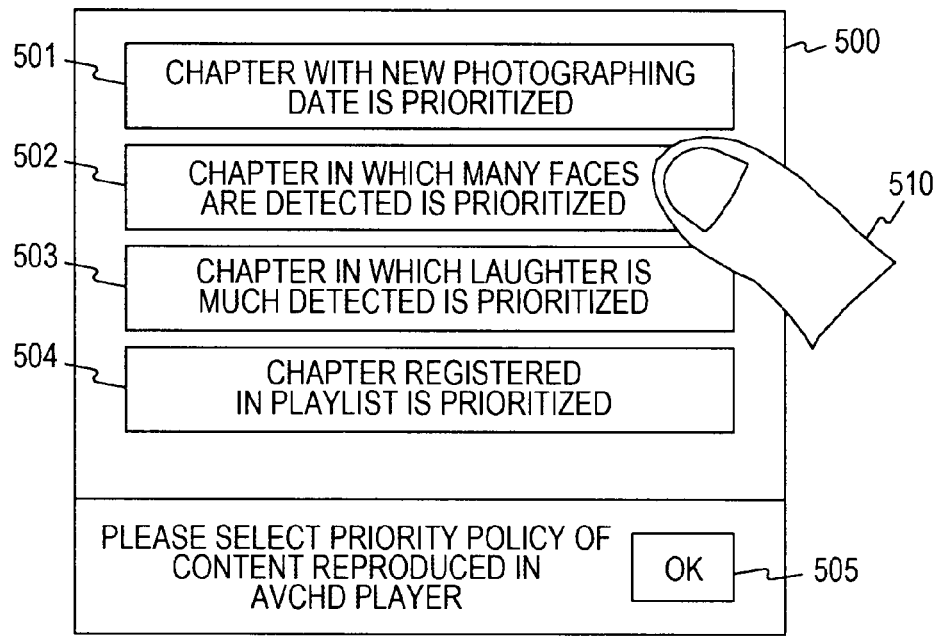

- 501: CHAPTER WITH NEW PHOTOGRAPHING DATE IS PRIORITIZED
- 502: CHAPTER IN WHICH MANY FACES ARE DETECTED IS PRIORITIZED
- 503: CHAPTER IN WHICH LAUGHTER IS MUCH DETECTED IS PRIORITIZED
- 504: CHAPTER REGISTERED IN PLAYLIST IS PRIORITIZED

PLEASE SELECT PRIORITY POLICY OF CONTENT REPRODUCED IN AVCHD PLAYER   OK

FIG. 4B

| CONTENT IDENTIFICATION INFORMATION | GENERATION DATE | FACE NUMBER | LAUGHTER EVALUATION VALUE | PLAYLIST REGISTRATION EXISTENCE | PRIORITY ORDER |
|---|---|---|---|---|---|
| #1 | 2/2/2010 13:25:25 | 3 | 125 | YES | 5 |
| #2 | 2/3/2010 10:30:15 | 2 | 53 | NO | 8 |
| #3 | 2/3/2010 23:25:27 | 1 | 24 | YES | 9 |
| #4 | 2/4/2010 14:20:25 | 3 | 85 | NO | 7 |
| #5 | 2/5/2010 09:40:01 | 4 | 105 | NO | 6 |
| #6 | 2/6/2010 15:07:20 | 8 | 754 | NO | 1 |
| #7 | 2/9/2010 07:25:21 | 4 | 345 | YES | 4 |
| #8 | 2/10/2010 18:20:45 | 5 | 456 | YES | 3 |
| #9 | 2/15/2010 10:10:05 | 7 | 478 | YES | 2 |

FIG. 5A

| CONTENT IDENTIFICATION INFORMATION ~521 | GENERATION DATE ~522 | FACE NUMBER ~523 | LAUGHTER EVALUATION VALUE ~524 | PLAYLIST REGISTRATION EXISTENCE ~525 | PRIORITY ORDER ~526 |
|---|---|---|---|---|---|
| #1 | 2/2/2010 13:25:25 | 3 | 125 | YES | 5 |
| #2 | 2/3/2010 10:30:15 | 2 | 53 | NO | 8 |
| #3 | 2/3/2010 23:25:27 | 1 | 24 | YES | 9 |
| #4 | 2/4/2010 14:20:25 | 3 | 85 | NO | 7 |
| #5 | 2/5/2010 09:40:01 | 4 | 105 | NO | 6 |
| #6 | 2/6/2010 15:07:20 | 8 | 754 | NO | 1 |
| #7 | 2/9/2010 07:25:21 | 4 | 345 | YES | 4 |
| #8 | 2/10/2010 18:20:45 | 5 | 456 | YES | 3 |
| #9 | 2/15/2010 10:10:05 | 7 | 478 | YES | 2 |

FIG. 5B

| CONTENT IDENTIFICATION INFORMATION ~521 | GENERATION DATE ~522 | FACE NUMBER ~523 | LAUGHTER EVALUATION VALUE ~524 | PLAYLIST REGISTRATION EXISTENCE ~525 | PRIORITY ORDER ~526 |
|---|---|---|---|---|---|
| #1 | 2/2/2010 13:25:25 | 3 | 125 | YES | 1 |
| #2 | 2/3/2010 10:30:15 | 2 | 53 | NO | 6 |
| #3 | 2/3/2010 23:25:27 | 1 | 24 | YES | 1 |
| #4 | 2/4/2010 14:20:25 | 3 | 85 | NO | 6 |
| #5 | 2/5/2010 09:40:01 | 4 | 105 | NO | 6 |
| #6 | 2/6/2010 15:07:20 | 8 | 754 | NO | 6 |
| #7 | 2/9/2010 07:25:21 | 4 | 345 | YES | 1 |
| #8 | 2/10/2010 18:20:45 | 5 | 456 | YES | 1 |
| #9 | 2/15/2010 10:10:05 | 7 | 478 | YES | 1 |

FIG. 7

| | 521 | 522 | 523 | 524 | 525 | 526 |
|---|---|---|---|---|---|---|
| | CONTENT IDENTIFICATION INFORMATION | GENERATION DATE | FACE NUMBER | LAUGHTER EVALUATION VALUE | PLAYLIST REGISTRATION EXISTENCE | PRIORITY ORDER |
| | #1 | 2/2/2010 13:25:25 | 3 | 125 | YES | 1 |
| | #2 | 2/3/2010 10:30:15 | 2 | 53 | NO | 7 |
| | #3 | 2/3/2010 23:25:27 | 1 | 24 | YES | 1 |
| | #4 | 2/4/2010 14:20:25 | 3 | 85 | NO | 1 |
| | #5 | 2/5/2010 09:40:01 | 4 | 105 | NO | 7 |
| | #6 | 2/6/2010 15:07:20 | 8 | 754 | NO | 1 |
| | #7 | 2/9/2010 07:25:21 | 4 | 345 | YES | 7 |
| | #8 | 2/10/2010 18:20:45 | 5 | 456 | YES | 1 |
| | #9 | 2/15/2010 10:10:05 | 7 | 478 | YES | 1 |

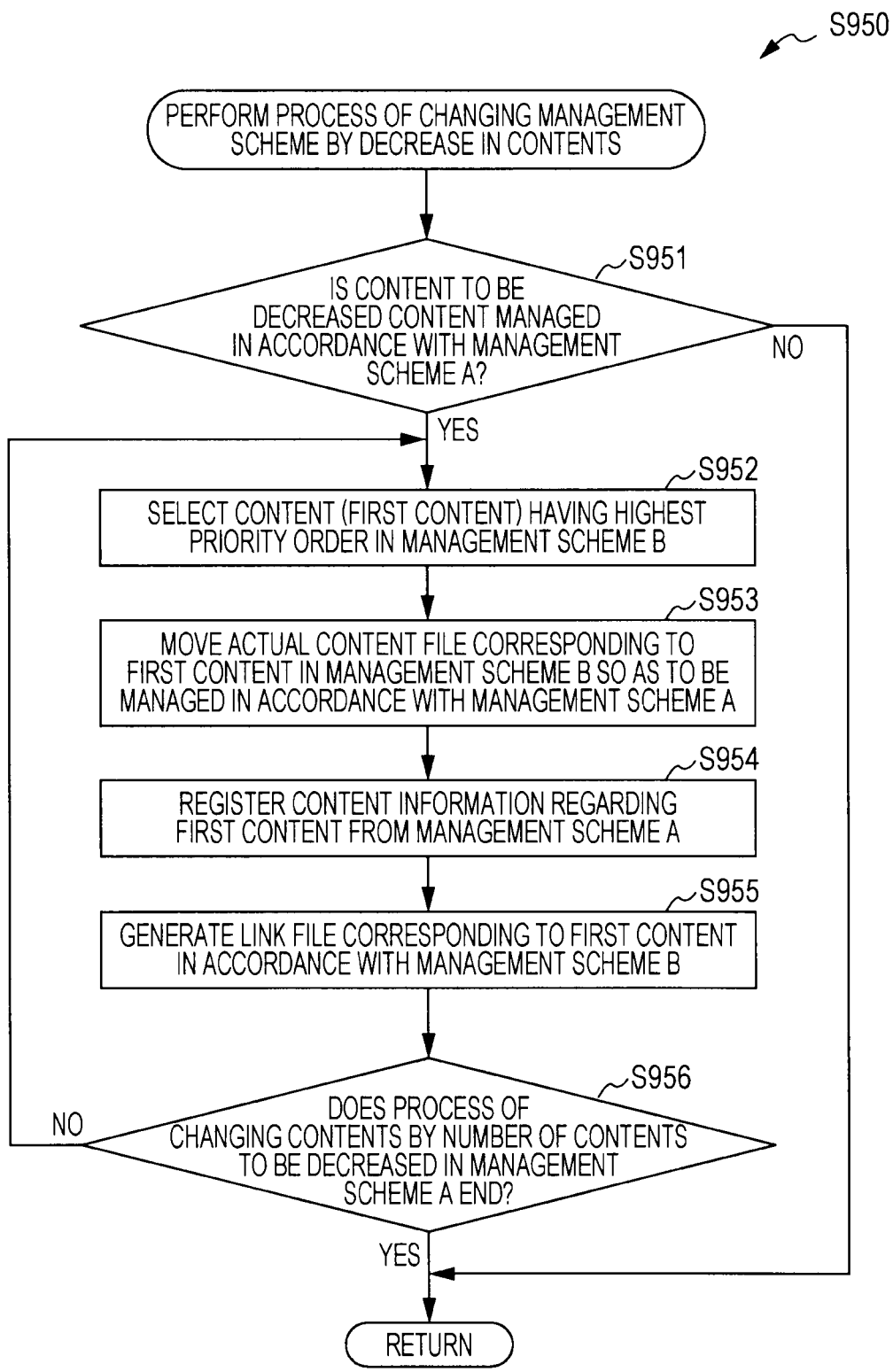

FIG. 23

```
<file>
  <name>"AVC00100.CPI"</name>
  <location>"/AVCHD/BDMV/CLIPINF/00000.CPI"</location>
</file>
<file>
  <name>"AVC00100.MTS"</name>
  <location>"/AVCHD/BDMV/STREAM/00000.MTS"</location>
</file>
<file>
  <name>"AVC00101.CPI"</name>
  <location>"/AVCHD/BDMV/CLIPINF/00001.CPI"</location>
</file>
<file>
  <name>"AVC00101.MTS"</name>
  <location>"/AVCHD/BDMV/STREAM/00001.MTS"</location>
</file>
```

INFORMATION PROCESSING APPARATUS, INFORMATION PROCESSING METHOD, AND PROGRAM

BACKGROUND OF THE INVENTION

1. Field of the Invention

The present invention relates to an information processing apparatus, and more particularly, to an information processing apparatus, an information processing method, and a program causing a computer to execute the information processing method.

2. Description of the Related Art

In recent years, imaging apparatuses, such as a digital still camera or a digital video camera (for example, a camera integrated type recorder), generating image data by imaging a subject such as a person or an animal and recording the image data as image contents have come into wide use. Moreover, there have been suggested information processing apparatuses which manage the recorded image contents in accordance with a content management format (recording format) such as an AVCHD method.

Such kinds of content management formats have an upper limit in the number of manageable contents in many cases. For example, the upper limit of the storm management number is set to 4000 in the content management format such as the AVCHD method. Moreover, one content management format is determined, when media are initialized, in many cases. Therefore, when the number of contents manageable in accordance with the content management format selected when the media are initialized reaches the upper limit, a problem may arise in that new contents may not be subsequently recorded.

Accordingly, there was suggested an information processing apparatus capable of managing contents in accordance with two or more kinds of content management formats. For example, there was suggested a recording apparatus which converts the content management format into another content management format when the number of image contents reaches the upper limit in a state where the recording apparatus manages the image contents in accordance with one content management format (for example, Japanese Unexamined Patent Application Publication No. 2007-295070 (FIG. 7)). For example, when the number of image contents managed in accordance with one content management format reaches the upper limit, the recording apparatus manages the subsequently added image contents in accordance with another content management format.

SUMMARY OF THE INVENTION

In the technique according to the related art, when the number of image contents reaches the upper limit of the content management format, the content management format is converted into another content management format so that the image contents can be managed in accordance with the content management format.

Here, for example, it is supposed that one content management format has a high compatibility and the other content management formats have a low compatibility among two or more kinds of content management formats. In this case, it is preferable that user's preference contents are managed in accordance with the content management format having a high compatibility. In the above-described technique according to the related art, however, the image contents are managed in accordance with another content management format, when the number of image contents reaches the upper limit of the content management format having a high compatibility. Therefore, for example, it is supposed that the user's preference contents are managed in accordance with the content management format having a low compatibility. In this case, for example, a problem may arise in that the user's preference contents may not be reproduced by another reproduction apparatus.

It is desirable to provide a technique capable of appropriately managing user's preference contents when contents are managed in accordance with a plurality of management schemes.

According to an embodiment of the invention, there is provided an information processing apparatus including a priority content setting unit setting at least one of a plurality of contents managed in accordance with at least one of a plurality of recording formats as a priority content based on selection of a user or a predetermined rule; and a control unit performing control to change the recording format for managing the priority content so that the priority content is managed in accordance with a specific recording format among the plurality of recording formats, when an operation input of the user is receivable and the operation input is an operation input associated with a specific operation. There are provided an information processing method and a program causing a computer to execute the information processing method. Thus, a process is realized which changes the recording format for managing the priority content so that the priority content is managed in accordance with the specific recording format, when the operation input of the user is the operation input associated with the specific operation.

In the information processing apparatus according to the embodiment of the invention, the control unit may perform control to change the recording format for managing the content, which is not set as the priority content among the contents managed in accordance with the specific recording format, from the specific recording format to another recording format, when the number of contents managed in accordance with the specific recording format reaches an upper limit number in a case where the recording format for managing the priority content is changed into the specific recording format. Thus, a process is realized which changes the recording format for managing the content, which is not set as the priority content among the contents managed in accordance with the specific recording format, from the specific recording format to another recording format, when the number of contents managed in accordance with the specific recording format reaches the upper limit number in the case where the recording format for managing the priority content is changed into the specific recording format.

In the information processing apparatus according to the embodiment of the invention, the priority content setting unit may give a priority order between the plurality of contents to every plurality of the contents based on the selection of the user or the predetermined rule and set the priority content based on the priority order. The control unit may perform control to change the recording format for managing the content having a high priority order so that the content having the high priority order is managed in accordance with the specific recording format, when the operation input is the operation input associated with the specific operation. Thus, a process is realized which gives the priority order between the plurality of contents to every plurality of the contents based on the selection of the user or the predetermined rule, sets the priority content based on the priority order, and changes the recording format for managing the content having the high priority order so that the content having the high priority order is managed in accordance with the specific recording format, when the operation input is the operation input associated with the specific operation.

In the information processing apparatus according to the embodiment of the invention, the control unit may perform control to change the recording format for managing the content having the high priority order from another recording format to the specific recording format, until the number of contents managed in accordance with the specific recording format reaches the upper limit number. Thus, a process is realized which changes the recording format for managing the content having the high priority order from another recording format to the specific recording format, until the number of contents managed in accordance with the specific recording format reaches the upper limit number.

In the information processing apparatus according to the embodiment of the invention, the priority content setting unit may determine the priority order based on the attribute of the plurality of contents. Thus, a process of determining the priority order based on the attribute of the plurality of contents is realized.

The information processing apparatus according to the embodiment of the invention may further include an operation reception unit receiving a designation operation of designating an attribute of the plurality of contents to set the priority content. The priority content setting unit may determine the priority order based on the designated attribute. Thus, a process is realized which determines the priority order based on the designated attribute, when receiving the designation operation of designating the attribute of the plurality of contents to set the priority content.

In the information processing apparatus according to the embodiment of the invention, the specific operation may be one of an operation of adding contents managed in accordance with the plurality of recording formats, an operation of changing the priority content, and an operation of decreasing the contents managed in accordance with the plurality of recording formats. Thus, a process of changing the recording format for managing the priority content is realized so that the priority content is managed in accordance with the specific recording format, when the specific operation may be one of the operation of adding contents managed in accordance with the plurality of recording formats, the operation of changing the priority content, and the operation of decreasing the contents managed in accordance with the plurality of recording formats.

In the information processing apparatus according to the embodiment of the invention, in a case where the operation input is the operation input associated with the specific operation, the control unit may perform control to change the recording format for managing the priority content from another recording format to the specific recording format when the priority content is not managed in accordance with the specific recording format, whereas the control unit may perform control not to change the recording format for managing the priority content when the priority content is managed in accordance with the specific recording format. Thus, when the operation input is the operation input associated with the specific operation, a process of changing the recording format for managing the priority content from another recording format to the specific recording format is realized when the priority content is not managed in accordance with the specific recording format, whereas the process of not changing the recording format for managing the priority content is realized when the priority content is managed in accordance with the specific recording format.

In the information processing apparatus according to the embodiment of the invention, the control unit may perform control to change the recording format for managing the priority content so that the priority content is shared between the specific recording format and another recording format, when the operation input is the operation input associated with the specific operation. Thus, a process is realized which changes the recording format for managing the priority content so that the priority content is shared between the specific recording format and another recording format, when the operation input is the operation input associated with the specific operation.

In the information processing apparatus according to the embodiment of the invention, the plurality of recording formats may be different in the upper limit number of contents to be managed. Thus, a process is realized which manages the plurality of contents in accordance with the plurality of recording formats different in the upper limit number of contents to be managed.

In the information processing apparatus according to the embodiment of the invention, the specific recording format may have high reproduction compatibility with other apparatuses other than the information processing apparatus. Thus, a process is realized which changes the recording format for managing the priority content so that the priority content is managed in accordance with the recording format (the specific recording format) with high reproduction compatibility with other apparatuses other than the information processing apparatus, when the operation input is the operation input associated with the specific operation.

In the information processing apparatus according to the embodiment of the invention, the specific recording format may have the less number of contents to be managed than the other recording formats. Thus, a process is realized which changes the recording format for managing the priority content so that the priority content is managed in accordance with the recording format (the specific recording format) having the less number of contents to be managed than the other recording formats, when the operation input is the operation input associated with the specific operation.

According to the embodiment of the invention, the advantage of appropriately managing the user's preference content can be obtained when the contents are managed in accordance with the plurality of management schemes.

BRIEF DESCRIPTION OF THE DRAWINGS

FIG. 1 is a block diagram illustrating an example of the functional configuration of an imaging apparatus according to a first embodiment of the invention.

FIGS. 3A and 3B are diagram schematically illustrating management schemes of the content management formats used to manage the image contents stored in the recording medium and link files which record link information according to the first embodiment of the invention.

FIGS. 4A and 4B are diagrams illustrating a setting example of priority contents by a priority content setting unit and an example of the set details according to the first embodiment of the invention.

FIGS. 5A and 5B are diagrams illustrating diagrams illustrating a setting example of priority contents by a priority content setting unit and an example of the set details according to the first embodiment of the invention.

FIG. 7 is a diagram illustrating an example of the setting details of the priority contents set by the priority content setting unit according to the first embodiment of the invention.

FIG. 21 is a flowchart illustrating an example of a process of changing the management scheme by decrease in the contents in the processing sequence of the process of changing the content management scheme by the imaging apparatus according to the first embodiment of the invention.

FIG. 23 is a diagram schematically illustrating a link file stored in the recording medium according to the modified example of the first embodiment of the invention.

DESCRIPTION OF THE PREFERRED EMBODIMENTS

Figure 2A:
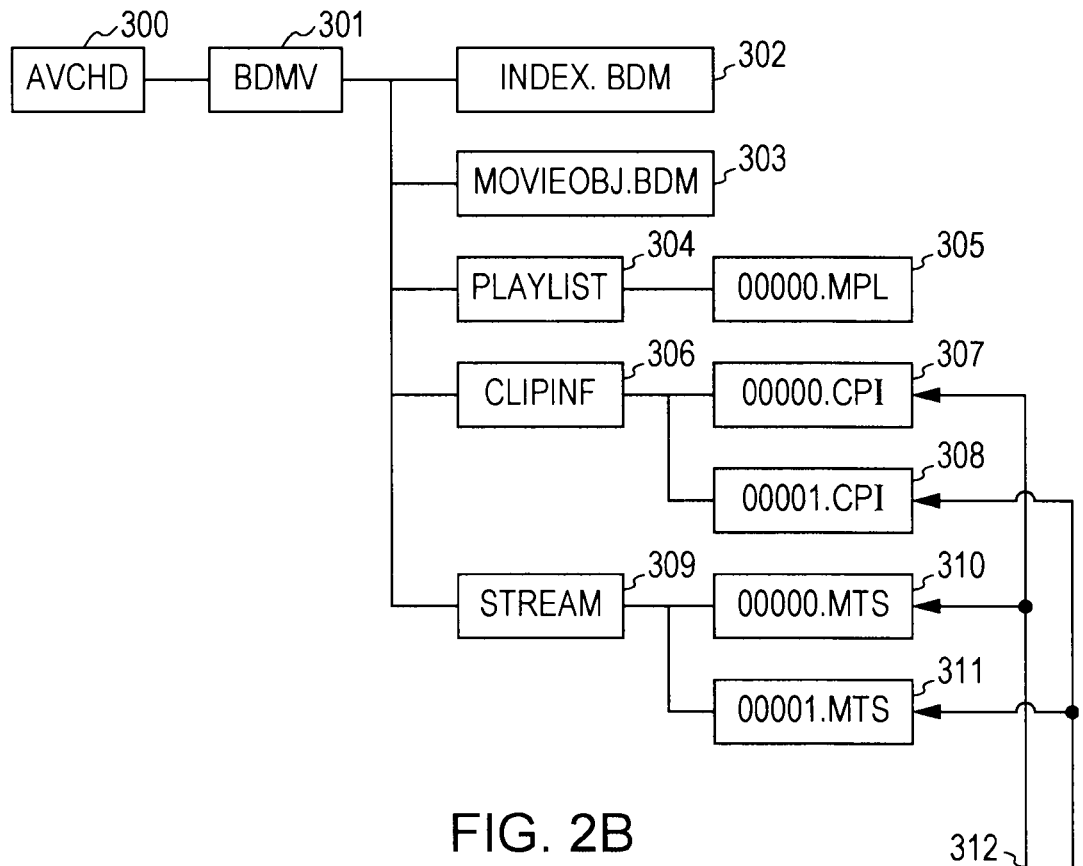
FIGS. 2A and 2B are diagrams illustrating examples of the file structure of image contents stored in a recording medium according to the first embodiment of the invention.

Hereinafter, preferred embodiments (hereinafter, referred to as embodiments) of the invention will be described. The description will be made in the following order.

1. First Embodiment (Content Management Control: Example in Which Management Target of Contents Manageable in accordance with Recording Formats of Two Management Schemes Is Changed Based on Priority Order)

2. Modified Examples

1. FIRST EMBODIMENT

Example of Configuration of Imaging Apparatus

FIG. 1 is a block diagram illustrating an example of the functional configuration of an imaging apparatus 100 according to a first embodiment of the invention. The imaging apparatus 100 includes an operation reception unit 110, a control unit 120, a content input unit 130, an imaging unit 140, a recording control unit 150, a priority content setting unit 160, a display control unit 170, a display unit 180, and a recording medium 200.

The operation reception unit 110 is a unit which receives operation details operated by a user and supplies an operation signal to the control unit 120 according to the received operation details. For example, the operation reception unit 110 corresponds to an operation unit such as a shutter button or a touch panel. For example, the touch panel is disposed on the display unit 180 in an overlapping manner so as to penetrate through the screen of the display unit 180 and receives an operation input from a user by detecting an object coming into contact with a display surface. That is, when the user presses his or her finger down at a desired position on the display surface of the display unit 180, the touch panel detects the coordinates of the pressed-down position and outputs an operation signal at the detected coordinates to the control unit 120. When the control unit 120 acquires the operation signal, the control unit 120 performs predetermined processing based on the acquired operation signal. A touch panel, which converts the contact of the finger on the display surface into an electric signal using, for example, a dedicated sensing device and outputs the converted electric signal to the control unit 120, may be used as the operation reception unit 110. Moreover, an optical sensor type touch panel, which is capable of detecting an object (for example, the finger of a user) coming close to the display surface or coming into contact with the display surface, may be used as the operation reception unit 110.

The control unit 120 controls each unit of the imaging apparatus 100 based on the operation details from the operation reception unit 110. For example, the control unit 120 determines whether the operation input is an operation input associated with a specific operation when the operation reception unit 110 receives the operation input. Moreover, when the operation input is the operation input associated with the specific operation, the control unit 120 performs control to change a management format (recording format) for managing the contents stored in the recording medium 200. That is, when a given condition is satisfied in the plurality of content management formats (for example, management schemes A and B shown in FIGS. 2A and 2B and the like), the content management format of the respective contents to be managed is changed. This change process is performed by the recording control unit 150. Here, the specific operation refers to an operation involving a content adding process such as photographing or copying, an operation involving a content decreasing process such as deleting or editing, and an operation of changing a priority order.

Specifically, the control unit 120 changes a management target of a priority content to be managed so that a priority content is managed in accordance with a specific content management format (for example, a management scheme A shown in FIG. 2 and the like), when the operation input is an operation input associated with the specific operation. The priority content is set by the priority content setting unit 160. For example, when the content management format of the priority content to be managed is changed into the specific content management format, it is supposed that the number of contents to be managed in accordance with the specific recording format reaches the upper limit number. In this case, the control unit 120 performs control to change the management format for managing the content, which is not set as the priority content, from the specific content management format to another content management format. The control details will be described in detail with reference to FIGS. 8 to 17.

The content input unit 130 inputs a content (such as a video content) output from an external apparatus. The content is supplied to the recording control unit 150.

The imaging unit 140 generates a captured image by capturing a subject under the control of the control unit 120 and supplies the generated captured image to the recording control unit 150. For example, the imaging unit 140 sequentially generates captured images (frames) at a predetermined frame rate, when the operation reception unit 110 receives an instruction operation (for example, an operation of pressing down a recording button) to record a video. Specifically, the imaging unit 140 includes an imaging element converting light of a subject incident through a lens into an electric signal and a signal processing unit processing the output signal of the imaging element and generating a digital image signal (image data). That is, when an optical image of a subject incident through the lens is formed on an imaging surface of the imaging element in the image unit 140, the imaging element performs an imaging process and the signal processing unit performs signal processing on the imaging signal to generate the digital image signal. Then, the generated image signal (digital image signal) is subjected to various kinds of imaging processings such as color and gray scale processings of interpolation or white balance to generate image data (captured image) to be recorded. For example, a CCD (Charge Coupled Device) or a CMOS (Complementary Metal Oxide Semiconductor) can be used as the imaging element.

The recording control unit 150 records the captured image output from the imaging unit 140 as an image file (image content) in the recording medium 200 under the control of the control unit 120. For example, the recording control unit 150 records the captured image output from the imaging unit 140 at a predetermined frame rate as a video image (video content) in the recording medium 200, when the operation reception unit 110 receives an instruction operation for video recording. The instruction operation for video recording is performed, for example, when the recording button is pressed down. Moreover, the recording control unit 150 records a content output from the content input unit 130 in the recording medium 200 under the control of the control unit 120.

The recording control unit 150 manages contents stored in the recording medium 200 in accordance with a plurality of content management formats (recording formats) under the control of the control unit 120. For example, when a given condition is satisfied in the plurality of content management formats (for example, the management schemes A and B shown in FIGS. 2A and 2B and the like), the recording control unit 150 changes the content management format of the respective contents to be managed. Specifically, the recording control unit 150 changes the management format of the priority content to be managed so that the priority content is managed in accordance with a specific content management format (for example, the management scheme A shown in FIGS. 2A and 2B and the like). For example, it is supposed that the number of contents which are the management target of the specific recording format reaches the upper limit number, when the recording control unit 150 changes the content management format of the priority content to be managed into a specific content management format. In this case, the recording control unit 150 changes the management format for managing the content, which is not set as the priority content, from the specific content management format to another content management format. This changing process will be described in detail with reference to FIGS. 8 to 17.

The priority content setting unit 160 sets at least one content as a priority content among the plurality of contents to be recorded in the recording medium 200 based on selection of a user or a predetermined rule. For example, the priority content setting unit 160 sets the content selected by the user as the priority content among the contents stored in the recording medium 200. Moreover, for example, the priority content setting unit 160 sets a content as the priority content based on the predetermined rule (for example, a given number as the priority content in order of the many number of faces contained in a subject). A preset rule may be used as the predetermined rule or the predetermined rule may be modified appropriately by an operation of the user. For example, the priority content setting unit 160 determines the priority order of the contents stored in the recording medium 200 based on the attribute of each content and sets the priority content based on the priority order. In this case, for example, when a designation operation of designating the attribute of the content to set the priority content is accepted, the priority order is determined based on the designated attribute. The determination of the priority order and the setting of the priority content will be described in detail with reference to FIG. 4A to 7.

The display control unit 170 allows the display unit 180 to display the image contents stored in the recording medium 200 or the image contents generated by the imaging unit 140 under the control of the control unit 120. For example, the display control unit 170 allows the display unit 180 to display various setting screens (for example, a setting screen 500 shown in FIG. 4A or a setting screen 530 shown in FIGS. 5A and 5B) or a monitoring image (so-called through image).

The display unit 180 is a display unit which displays various kinds of images under the control of the display control unit 170. For example, a LCD (Liquid Crystal Display), an organic EL (Electro Luminescence) panel, or the like may be used as the display unit 180.

The recording medium 200 stores the image data (captured images) generated by the imaging unit 140 as image files (image contents (still image contents or video contents))

under the control of the recording control unit 150. The recording medium 200 stores the contents input from the content input unit 130 under the control of the recording control unit 150. The recording medium 200 supplies the stored image contents to the display control unit 170. Specifically, the recording medium 200 stores the contents managed in accordance with two content management formats having the different upper limits of the number of manageable contents and shares some or all of the actual data files of the contents. The actual data file refers to a compressed data file itself of videos or still images or a file in which incidental data (such as attribute information) associated with the compressed data is stored.

For example, a disk such as a DVD (Digital Versatile Disk) or one or a plurality of removable recording media such as a semiconductor memory such as a memory card can be used as the recording medium 200. The recording medium may be included in the imaging apparatus 100 or may be detached from or attached to the imaging apparatus 100. The file structure of the contents stored in the recording medium 200 will be described in detail with reference to FIGS. 2A and 2B and FIGS. 3A and 3B.

Figure 2B:
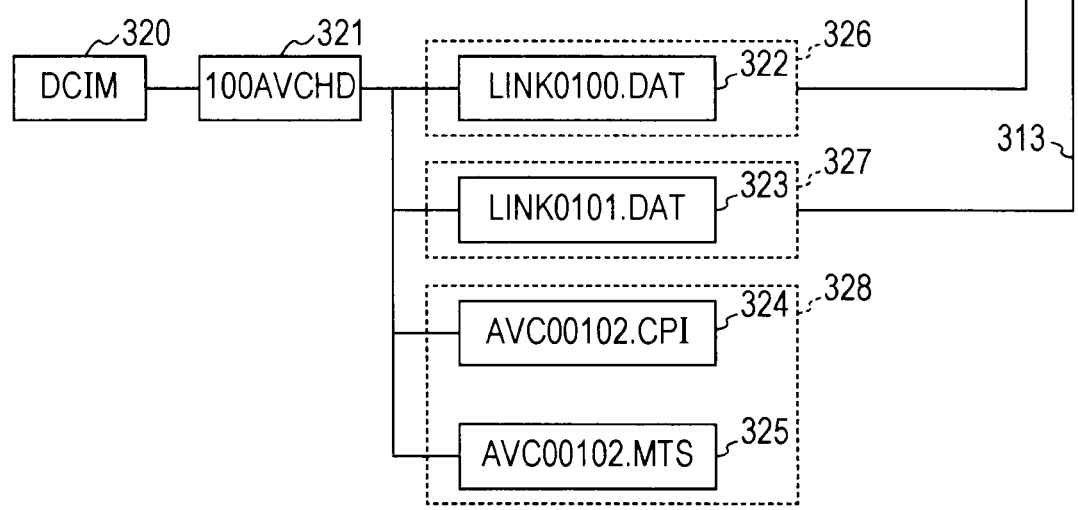

Example of Data Structure and Example of Management Scheme of Content Management Format FIGS. 2A and 2B are diagrams illustrating examples of the file structures of the image contents stored in the recording medium 200 according to the first embodiment of the invention. In the examples shown in FIGS. 2A and 2B, the image contents managed in accordance with two content management formats (the management schemes A and B) having different upper limits of the number of manageable contents are stored in one recording medium. In the example shown in FIG. 2A, the file structure of the image contents managed in accordance with the management scheme A is shown. In the example shown in FIG. 2B, the file structure of the image contents managed in accordance with the management scheme B is shown. The file structures shown in FIGS. 2A and 2B will be described in detail with reference to FIGS. 3A and 3B.

FIGS. 3A and 3B are diagrams schematically illustrating the management schemes of the content management formats used to manage the image contents stored in the recording medium 200 and link files which record link information according to the first embodiment of the invention. In FIG. 3A, the management scheme A (shown in FIG. 2A) and the management scheme B (shown in FIG. 2B) will be described as examples of a management scheme 201 of the content management format used to manage the image contents stored in the recording medium 200.

The management scheme A is a content management format in accordance with the AVCHD standard, as shown in a management specification 202. Specifically, the management scheme A is a management scheme of managing AVC video contents of the MPEG (Moving Picture Experts Group)-TS (Transport Stream) according to the AVCHD standard.

The management scheme B is a unique content management format in accordance with the DCF (Design rule for Camera File system) standard, as shown in a management specification 202. Specifically, the management scheme B is a management scheme of grouping and managing the AVC video contents (AVC stream file) of the MPEG-TS, which are extension image files of the DCF standard, as a DCF object. Likewise, the management scheme B is a management scheme of grouping and managing clip information files of the AVCHD standard, which are other DCF files, as the DCF object.

In FIG. 3B, the link file recorded in the management scheme B is schematically illustrated when actual data files are managed in accordance with another content management format (the management scheme A). The link file shown in FIG. 3B corresponds to a file "LINK0101.DAT" 323 shown in FIG. 2B.

Thus, in the management scheme B, the link files recording the link information as the DCF object are recorded and the relevance of the files is described, when the actual data files are managed according to another content management format (the management scheme A). That is, the contents in which the actual data files are managed in accordance with the management scheme A are shared and managed by the management schemes A and B.

A stream management number upper limit value 203 is "4000" in the management scheme A, whereas the stream management number upper limit value 203 is "8999100" in the management scheme B. A reproducer compatibility 204 is "high" in the management scheme A, whereas the reproducer compatibility 204 is "low" in the management scheme B.

Thus, the management scheme A has the characteristics in which the upper limit value of the stream management number is low and reproduction compatibility of a reproducer (player) is high. On the contrary, the management scheme B has the characteristics in which the upper limit value of the stream management number is high and reproduction compatibility of a reproducer is low.

Therefore, it is preferable that the image contents highly likely to be reproduced by a user are managed in accordance with the management scheme A. However, since the upper limit value of the stream management number is lower in the management scheme A than in the management scheme B, all of the image contents are supposed not to be managed by the management scheme A. In the first embodiment of the invention, the priority order is given to the respective image contents and the image contents with higher priority order are preferentially managed by the management scheme A.

Next, the file structures of the image contents managed by the management schemes A and B will be described with reference to FIGS. 2A and 2B.

A directory "AVCHD" 300 shown in FIG. 2A and a directory "DCIM" 320 shown in FIG. 2B are located under the root directory of the recording medium 200. A directory "BDMV" 301 is located under the directory "AVCHD" 300.

The directory "BDMV" 301 shown in FIG. 2A is a directory to which a folder and a file defined according to a video image recording application format belong.

A file "INDEX.BDM" 302 and a file "MOVIEOBJ.BDM" 303 are located immediately under the directory "BDMV" 301. A directory "PLAYLIST" 304, a directory "CLIPINF" 306, and a directory "STREAM" 309 are located under the directory "BDMV" 301.

The file "INDEX.BDM" 302 is an index file which stores the details of the directory "BDMV" 301 and is a file which registers and manages a video file (chapter). The file "MOVIEOBJ.BDM" 303 is a file which is determined in accordance with an application recording format and stores information regarding a movie object.

The directory "PLAYLIST" 304 is a directory in which a playlist database is located. For example, the directory "PLAYLIST" 304 includes a file (for example, a file "00000.MPL" 305) regarding a playlist. The file name of the file in the directory "PLAYLIST" 304 is formed by a five-digit number and an extension. In addition, ".MPL" is used as the extension of this file. The file in the directory "PLAYLIST" 304 is a unit in which access of each content to a video file (chapter) is registered, and a start point (IN point) and an end point (OUT point) are managed by designation of logical time.

The directory "CLIPINF" 306 is a directory in which a clip database is located. For example, the directory "CLIPINF" 306 includes clip information files (for example, files "00000.CPI" 307 and "00001.CPI" 308) corresponding to clip AV stream files, respectively. The file name of a file in the directory "CLIPINF" 306 is formed by a five-digit number and an extension. In addition, ".CPI" is used as the extension of this file. The file in the directory "CLIPINF" 306 is a file which manages access to an AV stream corresponding to a video file (chapter).

The directory "STREAM" 309 is a directory in which an AV stream file is located as an entity. For example, the directory "STREAM" 309 includes clip AV stream files (for example, files "00000.MTS" 310 and "00001.MTS" 311) corresponding to the clip information files, respectively. The file in the directory "STREAM" 309 is made from the transport stream of MPEG-2 and the file name is formed by a five-digit number and an extension. The five-digit number of the file name is set to be the same as that of the corresponding clip information file so that a correspondence relation between the clip information file and the clip AV stream file is shown. In addition, ".MTS" is used as the extension of each file. One file in the directory "STREAM" 309 is considered as one chapter.

The directory "DCIM" 320 is a directory to which a folder or a still image file defined in accordance with a still image recording application format belongs. A DCF directory (for example, a directory "100AVCHD" 321) is located immediately under the directory "DCIM" 320. Moreover, link files (for example, files "LINK0100.DAT" 322 and "LINK0101.DAT" 323) are located under the DCF directory. Furthermore, DCF files (files "AVC00102.CPI" 324 and "AVC00102.MTS" 325) are located under the DCF directory.

The link files "LINK0100.DAT" 322 and "LINK0101.DAT" 323 are link files in which link information is recorded as a DCF object. That is, such a link file is the link file in which the link information is recorded as the DCF object, when the actual data file is managed in accordance with another content management format (the management scheme A). Here, "LINK" is used as a free character of each link file and ".DAT" is used as an extension. Link designations corresponding to the respective link files are indicated by arrows 312 and 313 from rectangular shapes 326 and 327 indicated by a dotted line surrounding a rectangular shape corresponding to the respective link files.

The file "AVC00102.CPI" 324 is a DCF file in which the clip information file of the AVCHD standard is considered as the DCF object. In addition, the file "AVC00102.MTS" 325 is an extension image file of the DCF standard and is a DCF file in which the AVC video content (AVC stream file) of MPEG-TS is considered as the DCF object.

In the management scheme B, the files (the files "AVC00102.CPI" 324 and "AVC00102.MTS" 325) are grouped and managed as one content as the DCF object. The grouped DCF object is indicated by a dotted-line rectangular shape 328.

Example of Setting of Priority Order Based on Attribute of Contents

FIGS. 4A and 4B and FIGS. 5A and 5B are diagrams illustrating a setting example of the priority contents by the priority content setting unit 160 and an example of the set details according to the first embodiment of the invention. In FIG. 4A, an example of a setting screen (setting screen 500) displayed by the display unit 180 is shown when the priority content setting unit 160 sets the priority contents. For example, the display control unit 170 allows the display unit 180 to display the setting screen 500 based on an operation of the user. In the example shown in FIG. 4A, the priority order is set according to the preference of the user based on the attribute of the content.

Content attribute selection buttons 501 to 504 and a selection button 505 are displayed on the setting screen 500. The content attribute selection buttons 501 to 504 are buttons pressed down when the user selects a content attribute desired as the priority content.

For example, the content attribute selection button 501 is a button pressed down when a content (chapter) having a new photographing date is set to have a high priority order. The content attribute selection button 502 is a button pressed down when a content (chapter) containing many faces is set to have high priority order. The content attribute selection button 503 is a button pressed down when a content (chapter) containing much laughter is set to have high priority order. The content attribute selection button 504 is a button pressed down when a content (chapter) registered in a playlist is set to have high priority order.

The selection button 505 is a button pressed down when a user executes a selection operation (presses down the content attribute selection buttons 501 to 504) to select the attribute of a desired content as the priority content and then determines the selection.

Thus, the control unit 120 outputs a control signal set to correspond to the selected content attribute selection button to the priority content setting unit 160, when the user selects the attribute of the content and presses down the determination button 505. When receiving the control signal, the priority content setting unit 160 sets the priority order of the contents stored in the recording medium 200 based on the attributes of the contents corresponding to the selected content attribute selection button. Specifically, the priority content setting unit 160 acquires the attribute information (content attribute information) recorded in association with each of the contents stored in the recording medium 200 and sets the priority order of the contents using the acquired attribute information. For example, the content attribute information is recorded inside the image content (image file) or is recorded as content management information in a content management file or the like. The setting details of the priority order are shown in FIG. 4B and FIGS. 5A and 5B.

The priority order set in this manner is recorded as content attribute information. For example, the content attribute information may be recorded in the image content (image file) or may be recorded as content management information in a content management file or the like.

In FIG. 4B and FIGS. 5A and 5B, examples of the setting details of the priority order set on the setting screen 500 shown in FIG. 4A are schematically shown. In FIG. 4B, the setting details of the priority order are shown when the content attribute selection button 502 is pressed down, as shown in FIG. 4A, and then the determination button 505 is pressed down by a finger 510 of a user. In FIG. 4B, content identification information 521, a generation date 522, a face number 523, a laughter evaluation value 524, a playlist registration existence 525, and a priority order 526 are shown in association therewith as the content attribute information.

The content identification information 521 is identification information used to identify the contents stored in the recording medium 200 from each other. In the example shown in FIG. 4B, content identification information (#1 to #9) regarding contents #1 to #9 are stored as the content identification information 521. For example, the content identification information is given to the respective contents in the order of the photographing date.

The generation date 522 is a date (photographing date) at which the contents stored in the recording medium 200 are generated.

The face number 523 is the number of faces contained in the content stored in the recording medium 200. For example, a face detection process is performed by a face detection unit (not shown) in an operation of imaging the content. Face information (for example, the position and size of a face image) regarding a face detected through the face detection process is recorded in association with a frame to be detected. The number of faces is calculated for each content based on the recorded face information and is recorded as the face number 523.

The laughter evaluation value 524 is an evaluation value (laughter evaluation value) regarding laughter contained in the content stored in the recording medium 200. For example, voice data of the content is analyzed chronologically in the operation of imaging the content and the feature of the voice data is extracted chronologically based on the analysis result of the voice data. The details of the voice data can be analyzed using various general analysis methods. The laughter evaluation value is calculated based on the feature of the extracted voice data and is recorded as the laughter evaluation value 524.

The playlist registration existence 525 is information which indicates whether the content stored in the recording medium 200 is registered in the playlist. For example, this playlist is a playlist (for example, the file "00000.MPL" 305 shown in FIG. 2A) of the AVCHD standard. The playlist of the AVCHD standard includes a clip to be reproduced and information regarding the start point and the end point of the clip.

The priority order 526 is priority order set by the priority content setting unit 160. In the example shown in FIG. 4B, the setting details of the priority order are shown when the content attribute selection button 502 is pressed down and then the determination button 505 is pressed down. Therefore, the priority order is determined according to the largeness or smallness of the face number 523. That is, the priority order of the content ("#6" of the content identification information 521) with the largest number stored in the face number 523 is determined to be 1st. On the other hand, the priority order of the content ("#3" of the content identification information 521) with the smallest number stored in the face number 523 is determined as the lowest rank (9th). The priority order of the other contents is also determined according to the largeness or smallness numbers stored in the face number 523.

In FIG. 5A, the setting details of the priority order is shown when the content attribute selection button 503 is pressed down and then the determination button 505 is pressed down. The content attribute information shown in FIG. 5A is the same as that shown in FIG. 4B except that the details of the priority order 526 are different.

In the example shown in FIG. 5A, the setting details of the priority order are shown when the content attribute selection button 503 is pressed down and then the determination button 505 is pressed down. Therefore, the priority order is determined according to the size of the laughter evaluation value 524. That is, the priority order of the content ("#6" of the content identification information 521) with the largest number stored in the laughter evaluation value 524 is determined to be 1st. On the other hand, the priority order of the content ("#3" of the content identification information 521) with the smallest number stored in the laughter evaluation value 524 is determined as the lowest rank (9th). The priority order of the other contents is also determined according to the largeness or smallness numbers stored in the laughter evaluation value 524.

In FIG. 5B, the setting details of the priority order is shown when the content attribute selection button 504 is pressed down and then the determination button 505 is pressed down. The content attribute information shown in FIG. 5B is the same as that shown in FIG. 4B except that the details of the priority order 526 are different.

In the example shown in FIG. 5B, the setting details of the priority order are shown when the content attribute selection button 504 is pressed down and then the determination button 505 is pressed down. Therefore, the priority order is determined according to the details of the playlist registration existence 525. That is, the priority order of the contents ("#1", "#3", "#7" to "#9" of the content identification information 521) with "YES" stored in the playlist registration existence 525 is determined to be 1st. On the other hand, the priority order of the content ("#2" and "#4" to "#6" of the content identification information 521) with "NO" stored in the playlist registration existence 525 is determined as the lowest rank (6th).

The setting of the priority order can be performed in the same manner when the content attribute selection button 501 is pressed down and then the determination button 505 is pressed down. In this case, the priority order is determined according to the details of the generation date 522 (current and past generation dates).

The priority contents are set based on the determined priority order. That is, the contents in which the determined priority order falls within the range of the number (upper limit number) of the contents to be managed in accordance with the management scheme A are set as the priority contents.

As described above, the example has been described in which the priority order is determined based on four kinds of attributes (the photographing date of the contents, the number of faces contained in the contents, the laughter contained in the contents, the playlist registration existence) of the contents which are the attributes of the contents. However, the priority order may be determined based on other conditions. For example, when a plurality of contents (still image contents) is generated by a series of continuous photographing and the plurality of contents is grouped, a condition in which a content of a representative image is set to have high priority order among the group contents may be used.

Alternatively, the priority order may be determined based on the attributes of the plurality of contents. For example, the attribute of a first priority content and the attribute of a second priority content are designated and the priority order can be determined based on these attributes. For example, it is assumed that the attribute of the first priority content is the playlist registration existence and the attribute of the second priority content is the number of faces. In this case, the contents (#1, #3, and #7 to #9) of the "1st" priority order and the contents (#2 and #4 to #6) of the 6th priority order are determined based on the playlist registration existence 525. In addition, the priority orders (1st to 5th) are determined for the contents having the "1st" priority order based on the face number 523 and the priority orders (6th to 9th) are determined for the contents having the "6th" priority order based on the face number 523.

In FIGS. 4A and 4B and FIGS. 5A and 5B, the example has been described in which the priority order of the contents are determined based on the attributes of the selected contents by the operation of the user. However, desired contents may be selected by an operation of the user.

Example of Setting of Priority Content Based on Selection of User

Figure 6A:
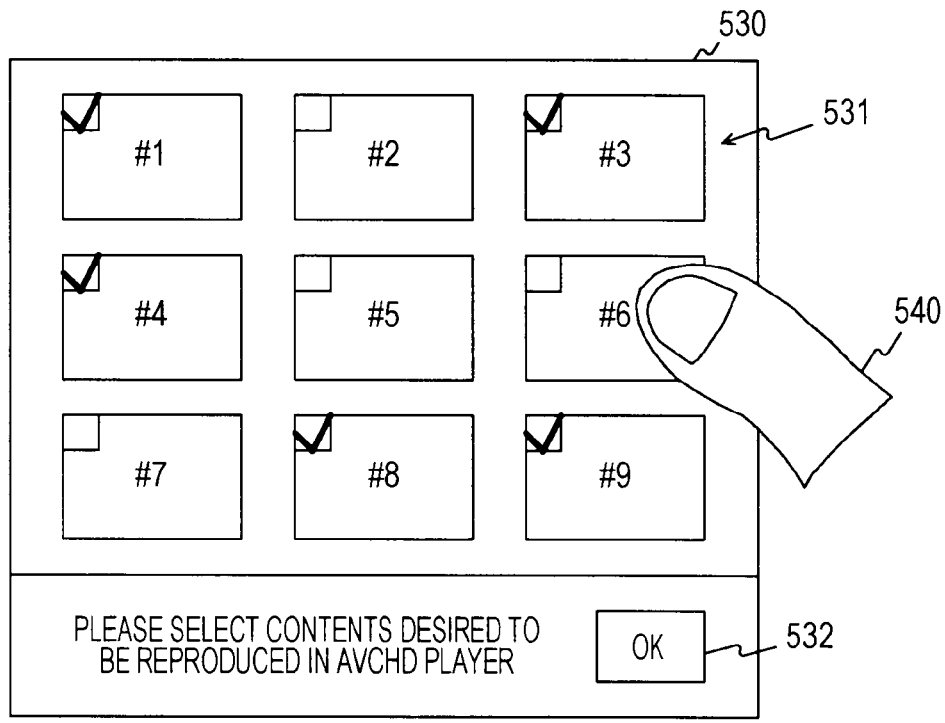
FIGS. 6A and 6B are diagrams illustrating an example of a display transition of a setting screen displayed by a display unit when the priority content setting unit sets the priority contents according to the first embodiment of the invention.
Figure 6B:
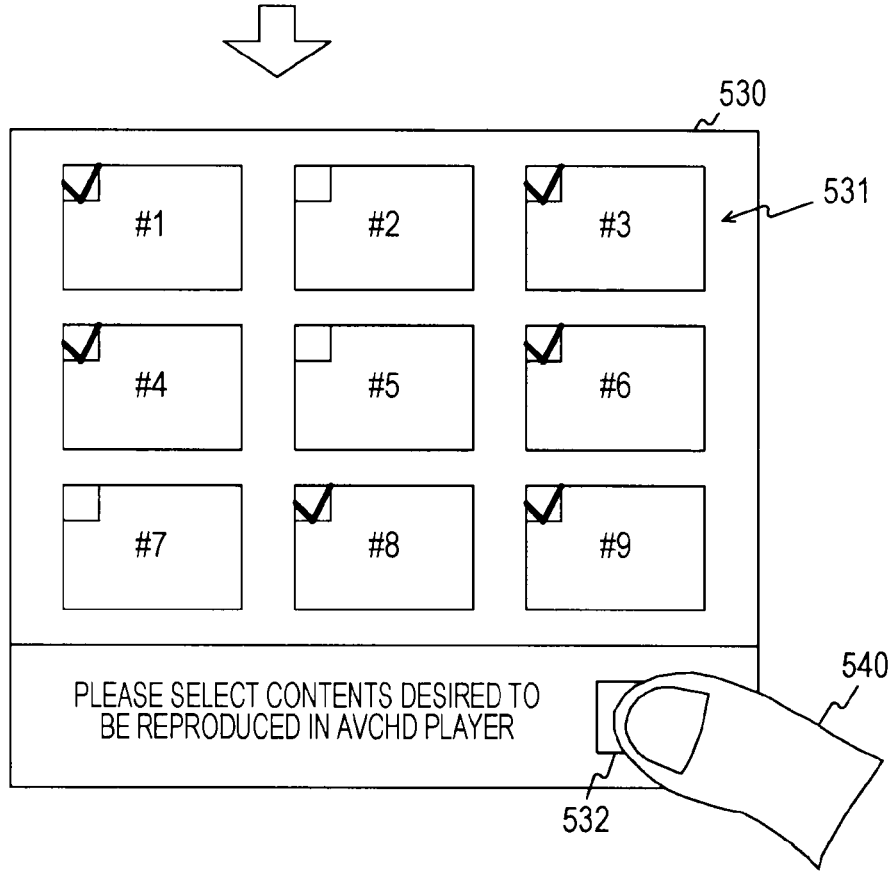

FIGS. 6A and 6B are diagrams illustrating an example of display transition of a setting screen displayed by the display unit 180 when the priority content setting unit 160 sets the priority contents according to the first embodiment of the invention. The display control unit 170 allows the display unit 180 to display a setting screen 530 shown in FIGS. 6A and 6B, for example, by an operation of the user.

A content list display region 531 and a determination button 532 are displayed on the setting screen 530 shown in FIG. 6A. A list of images (for example, representative images) indicating the contents stored in the recording medium 200 are displayed in the content list display region 531. In FIGS. 6A and 6B, the images indicating the contents are simply shown by rectangular shapes attached with the content identification information therein. A check section indicating whether a selection operation is executed by the user is formed at the upper left corner of each image indicating the content. That is, a check is attached to the check section of the image indicating that the selection operation is executed by the user. In the example shown in FIG. 6A, the contents #1, #3, #4, #8, and #9 subjected to the selection operation of the user are shown.

The determination button 532 is a button pressed down when the user selects the priority contents and then determines the selection.

For example, it is supposed that the rectangular region corresponding to the content #6 is pressed down by a finger 540 of the user in the setting screen 530 shown in FIG. 6A. In this case, a check is attached to the check section of the image indicating the content #6 in the setting screen 530, as shown in FIG. 6B. That is, in FIG. 6B, the content #6 is selected together with the previously selected contents #1, #3, #4, #8, and #9. In this state, when the determination button 532 is pressed down, the contents #1, #3, #4, #6, #8, and #9 of which the check is attached to the check section are determined as the priority contents.

FIG. 7 is a diagram illustrating an example of the setting details of the priority contents set by the priority content setting unit 160 according to the first embodiment of the invention. In FIG. 7, the setting details of the priority order are shown when the determination button 532 is pressed down in the setting screen 530 shown in FIG. 6B. The content attribute information shown in FIG. 7 is the same as the example shown in FIG. 4B except that the details of the priority order 526 are different.

In the example shown in FIG. 7, the setting details of the priority order are shown when the determination button 532 is pressed down in the setting screen 530 shown in FIG. 6B. Therefore, the priority order is determined depending on whether the selection operation is performed. That is, the priority order of the contents (#1, #3, #4, #6, #8, and #9) selected in the setting screen 530 is determined to be 1st. On the other hand, the priority order of the contents (#2, #5, and #7) which are not selected in the setting screen 530 is determined to be 7th.

When the priority order is determined in the setting screen 500 shown in FIG. 4A and the setting screen 530 shown in FIGS. 6A and 6B, for example, the priority order determined in the setting screen 530 shown in FIGS. 6A and 6B can be determined to be 1st.

The priority contents are set based on the priority order determined in this manner. For example, the contents of which the determined priority order falls within the number (upper limit number) of contents to be managed in accordance with the management scheme A are set as the priority contents.

In the first embodiment of the invention, the priority order and the priority content are set for each of the contents stored in the recording medium 200. Thus, it is possible to easily select the contents shared from the content having high priority order up to the upper limit number of manageable contents according to the preference of the user.

Example of Change of Management Scheme by Addition of Contents

FIGS. 8A and 8B to FIGS. 11A and 11B are diagrams schematically illustrating a flow when a content management scheme is changed by the recording control unit 150 according to the first embodiment of the invention. In the example shown in FIGS. 8A and 8B to FIGS. 11A and 11B, when the image contents are added to the recording medium 200, the management schemes of the added image contents are sequentially determined based on the priority order. In the example shown in FIGS. 8A and 8B to FIGS. 11A and 11B, the priority order of the content of which the generation date is new is set to be high. In this case, the priority order of the content to be added is set to be 1st. In the example shown in FIGS. 8A and 8B to FIGS. 11A and 11B, in order to facilitate description, it is assumed that the upper limit of the number of contents manageable in accordance with the management scheme A (AVCHD standard) is 2.

Figure 8A:
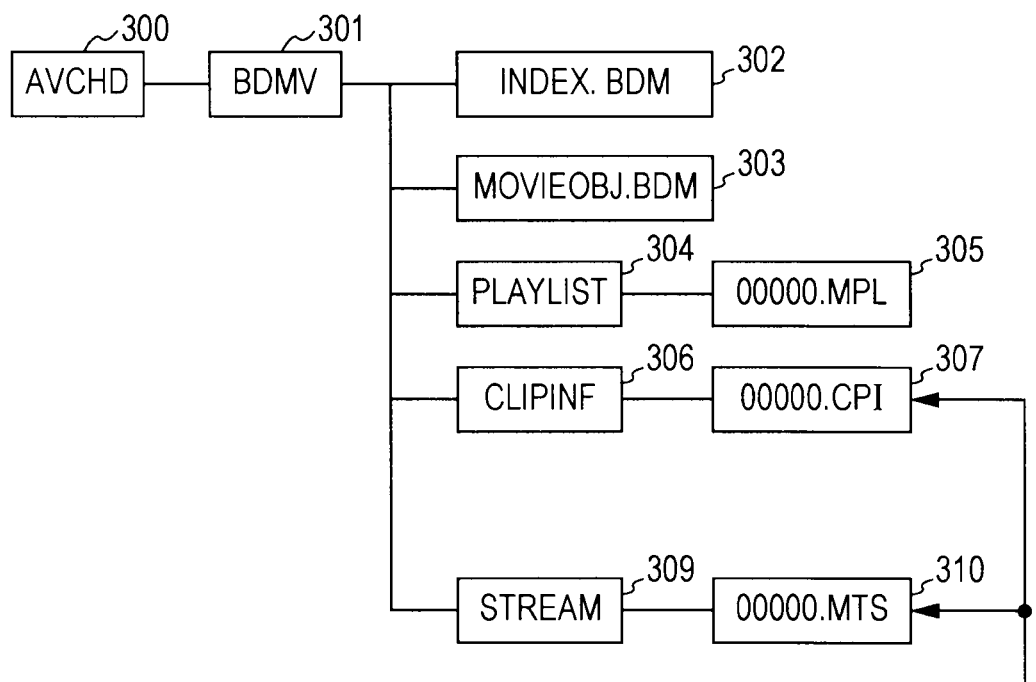
FIGS. 8A and 8B are diagrams schematically illustrating a flow when a content management scheme is changed by a recording control unit according to the first embodiment of the invention.
Figure 8B:
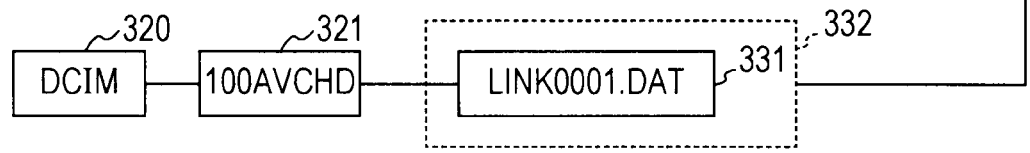

In FIGS. 8A and 8B, one image content is newly recorded. When the image content is newly recorded, for example, the video content generated by the imaging unit 140 is recorded in the recording medium 200. In FIGS. 8A and 8B, the same reference numerals are given to the same constituent elements as those shown in FIGS. 2A and 2B. Specifically, as shown in FIG. 8A, the clip information file (file "00000.CPI" 307) is recorded under the directory "CLIPINF" 306. The clip AV stream file (file "00000.MTS" 310) is recorded under the directory "STREAM" 309.

As shown in FIG. 8B, the link file (file "LINK0001.DAT" 331) is recorded under the directory "100AVCHD" 321. The link destination corresponding to this link file is indicated by an arrow 335 from a dotted line rectangular shape 332 surrounding a rectangular shape corresponding to the link file.

In the example shown in FIGS. 8A and 8B, the number of contents of the management scheme A does not reach the upper limit, since the number of image contents newly recorded is one. Therefore, the newly added image content is recorded by the management scheme A and only the link file is recorded by the management scheme B.

Figure 9A:
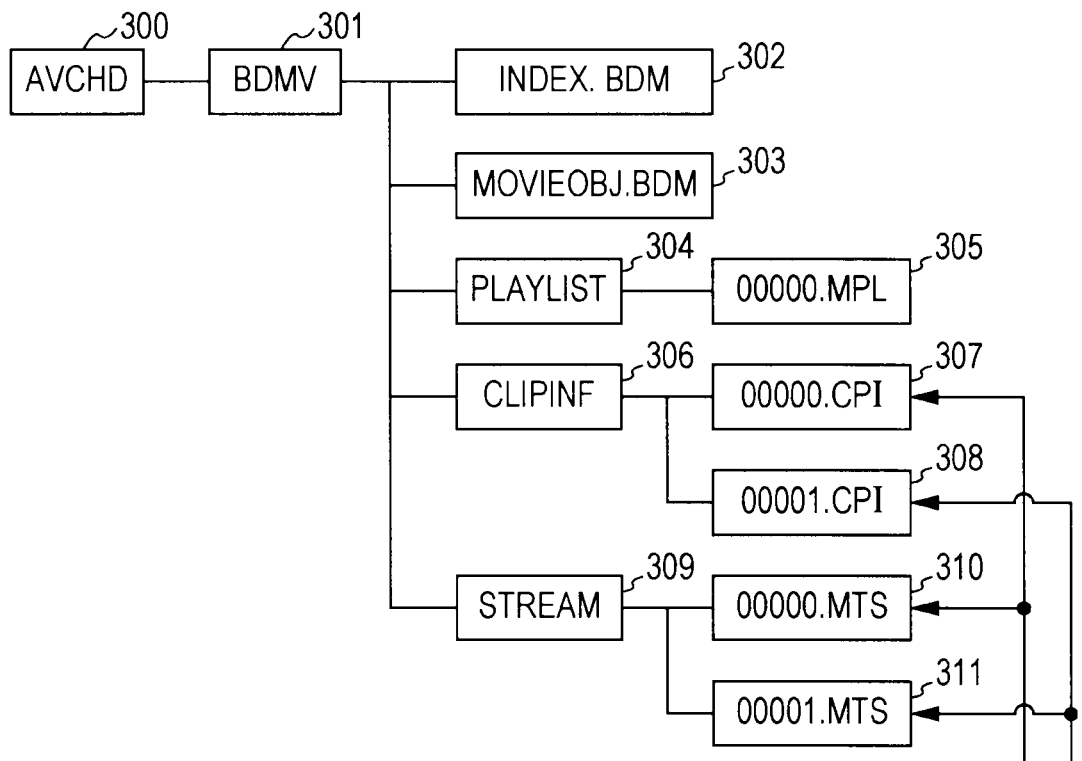
FIGS. 9A and 9B are diagrams schematically illustrating a flow when the content management scheme is changed by the recording control unit according to the first embodiment of the invention.
Figure 9B:
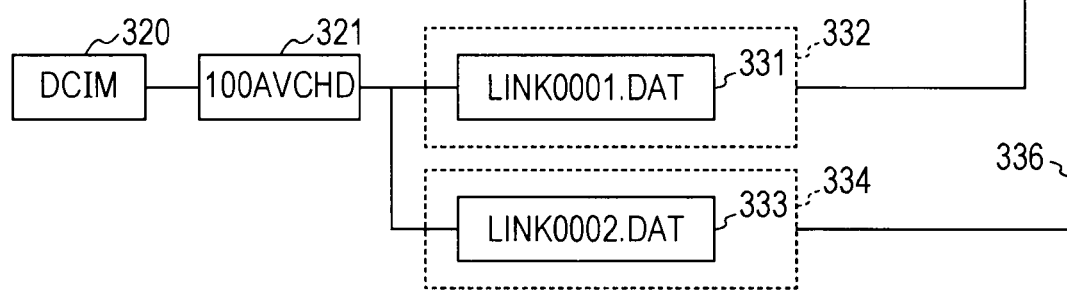

In the example shown in FIGS. 9A and 9B, one image content is newly recorded after the one image content is recorded (shown in FIGS. 8A and 8B). In FIGS. 9A and 9B, the same reference numerals are given to the same constituent elements as those shown in FIGS. 8A and 8B. Specifically, as shown in FIG. 9A, the clip information file (file "00001.CPI" 308) is recorded under the directory "CLIPINF" 306. The clip AV stream file (file "00001.MTS" 311) is recorded under the directory "STREAM" 309.

As shown in FIG. 9B, a link file (file "LINK0002.DAT" 333) is recorded under the directory "100AVCHD" 321. The link destination corresponding to this link file is indicated by an arrow 336 from a dotted line rectangular shape 334 surrounding a rectangular shape corresponding to the link file.

In the example shown in FIGS. 9A and 9B, the number of contents to be managed is two, since the number of image contents previously recorded is one and the number of image contents newly added is one. Since the number of contents to be managed is two, the upper limit of the number of contents of the management scheme A falls within the range of the upper limit. Therefore, the newly added image content is recorded by the management scheme A and only the link file is recorded by the management scheme B.

Figure 10A:
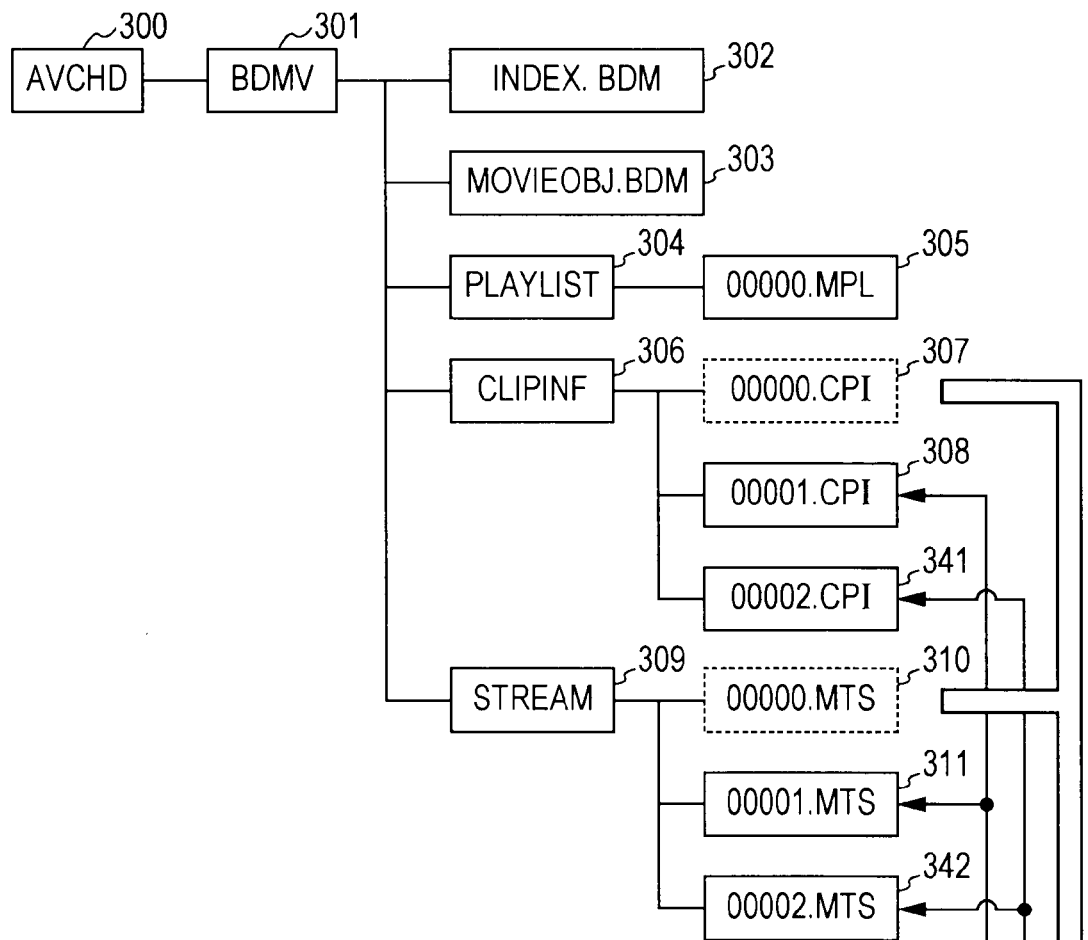
FIGS. 10A and 10B are diagrams schematically illustrating a flow when the content management scheme is changed by the recording control unit according to the first embodiment of the invention.
Figure 10B:
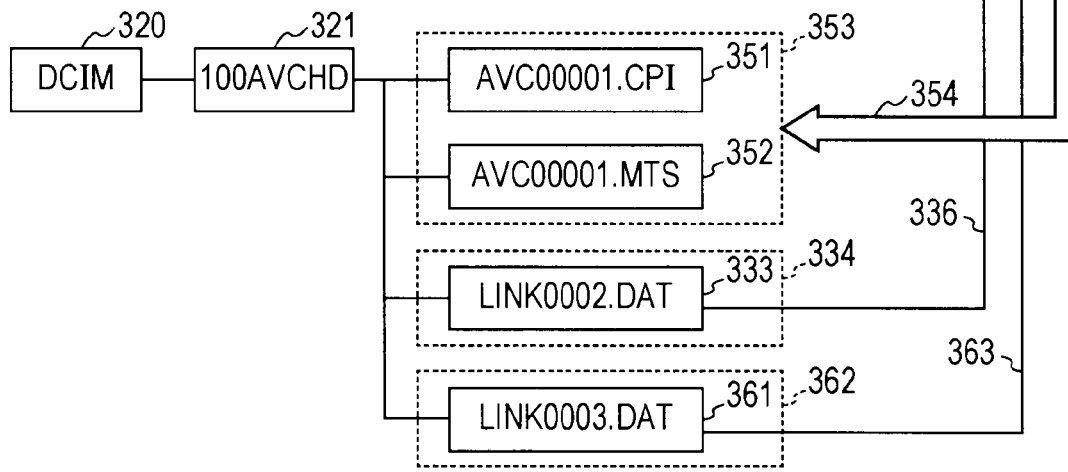

In the example shown in FIGS. 10A and 10B, one image content is newly recorded after the two image contents are recorded (shown in FIGS. 9A and 9B). In FIGS. 10A and 10B, the same reference numerals are given to the same constituent elements as those shown in FIGS. 9A and 9B.

In the example shown in FIGS. 10A and 10B, the number of contents to be managed is three, since the number of image contents previously recorded is two and the number of image contents newly added is one. Since the number of contents to be managed is three, the upper limit of the number of contents of the management scheme A exceeds the range of the upper limit. Therefore, among the image contents recorded in accordance with the management scheme A, the image contents moved from the management scheme A to the management scheme B are determined according to the priority order.

Specifically, the image contents (the contents with the oldest generation date) with the lowest priority order are determined as the image contents moved from the management scheme A to the management scheme B. As indicated by a white arrow 354, the determined image contents managed from the management scheme A are moved so as to be managed in accordance with the management scheme B. That is, the image contents (the AV stream file (MTS) and the clip information file (CPI)) recorded in accordance with the management scheme A are moved so as to be managed in accordance with the management scheme B. Specifically, the image contents (the files "00000.CPI" 307 and "00000.MTS" 310) recorded in accordance with the management scheme A are moved and recorded under the directory "100 AVCHD" 321. In this case, image contents (files "AVC00001.CPI" 351 and "AVC00001.MTS" 352) are recorded under the directory "100 AVCHD" 321. After the movement of the files, the image contents (the files "00000.CPI" 307 and "00000.MTS" 310) recorded in accordance with the management scheme A are deleted.

The newly added image contents are recorded in accordance with the management scheme A. Specifically, as shown in FIG. 10A, a clip information file (file "00002.CPI" 341) is recorded under the directory "CLIPINF" 306. A clip AV stream file (file "00002.MTS" 342) is recorded under the directory "STREAM" 309.

Figure 11A:
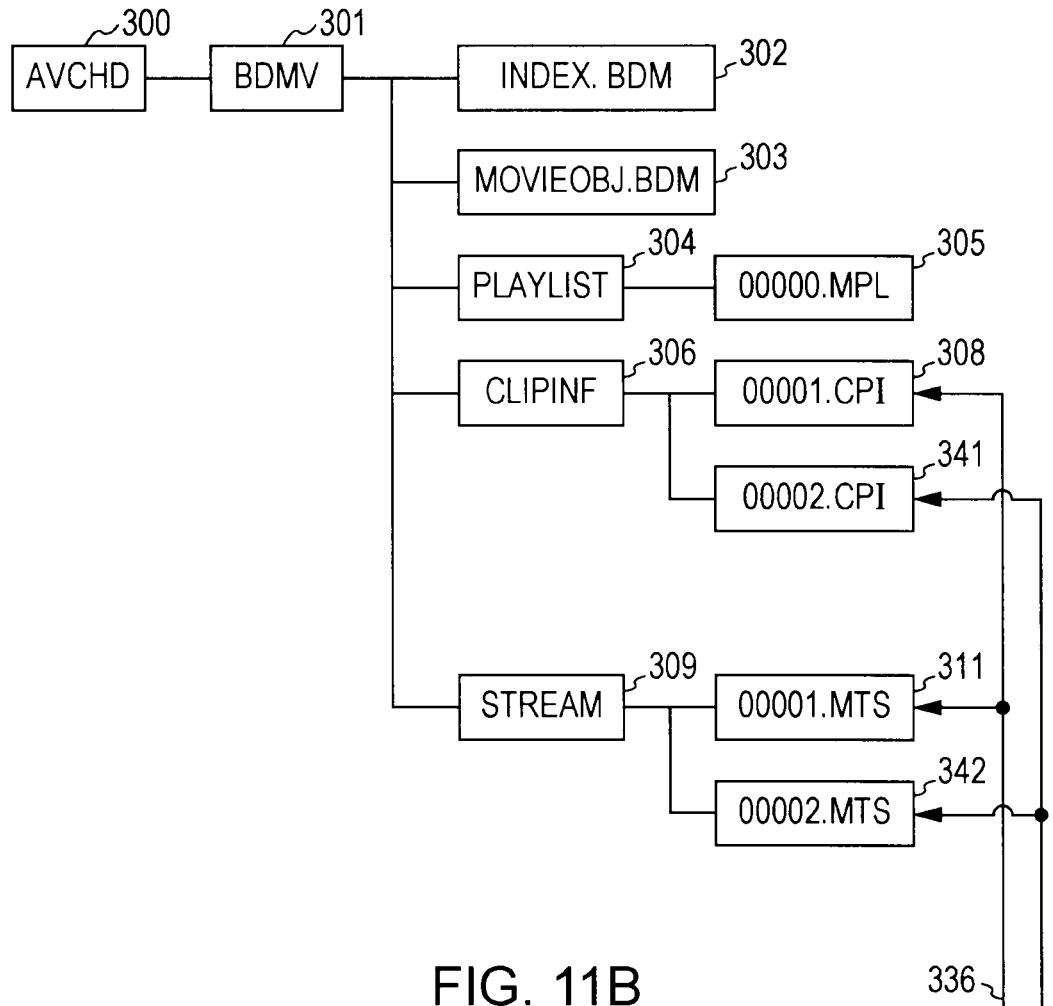
FIGS. 11A and 11B are diagrams schematically illustrating a flow when the content management scheme is changed by the recording control unit according to the first embodiment of the invention.
Figure 11B:
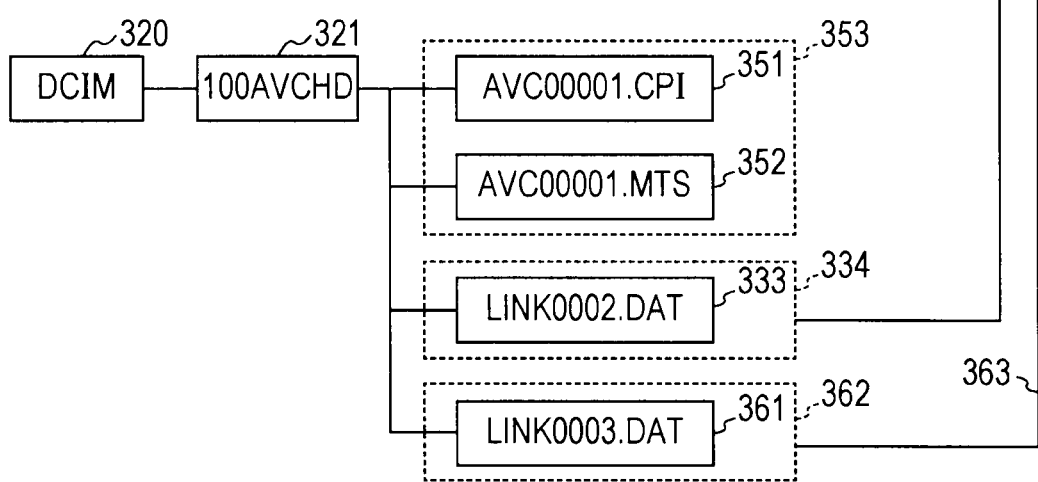

As shown in FIG. 10B, the link file (file "LINK0003.DAT" 361) is recorded under the directory "100 AVCHD" 321. The link destination corresponding to this link file is indicated by an arrow 363 from a dotted line rectangular shape 362 surrounding a rectangular shape corresponding to the link file. A recording example after the above recording process is shown in FIGS. 11A and 11B. As shown in FIG. 10B, the link file (the file "LINK0001.DAT" 331, as shown in FIGS. 8B and 9B) recorded under the directory "100 AVCHD" 321 is deleted.

In FIGS. 11A and 11B, the recording example after the recording of the three image contents (as shown in FIGS. 10A and 10B) is shown. In FIGS. 11A and 11B, the same reference numerals are given to the same constituent elements as those shown in FIGS. 10A and 10B.

Example of Change of Management Scheme by Change in Priority Order

FIGS. 12A and 12B to FIGS. 14A and 14B are diagrams schematically illustrating a flow when a content management scheme is changed by the recording control unit 150 according to the first embodiment of the invention. In the examples shown in FIGS. 12A and 12B to FIGS. 14A and 14B, when the priority order is changed by the priority content setting unit 160, the management scheme of the image contents recorded in the recording medium 200 is changed based on the changed priority order. In FIGS. 12A and 12B to FIGS. 14A and 14B, the priority order of the image content recorded in the recording medium 200 is indicated by a parenthesis within the corresponding rectangular shape. Moreover, in FIGS. 12A and 12B to FIGS. 14A and 14B, in order to facilitate description, it is assumed that the upper limit of the number of contents manageable in accordance with the management scheme A (AVCHD standard) is two.

Figure 12A:
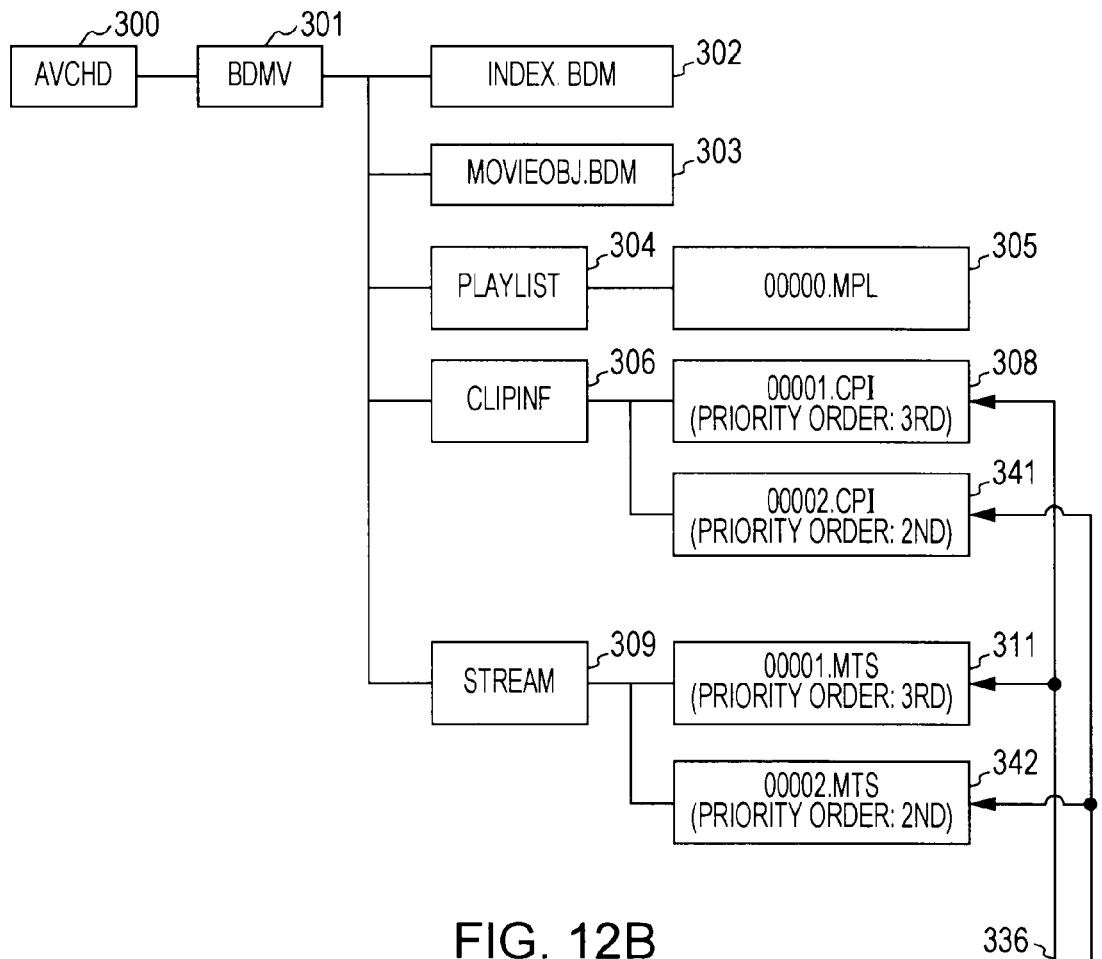
FIGS. 12A and 12B are diagrams schematically illustrating a flow when a content management scheme is changed by the recording control unit according to the first embodiment of the invention.
Figure 12B:
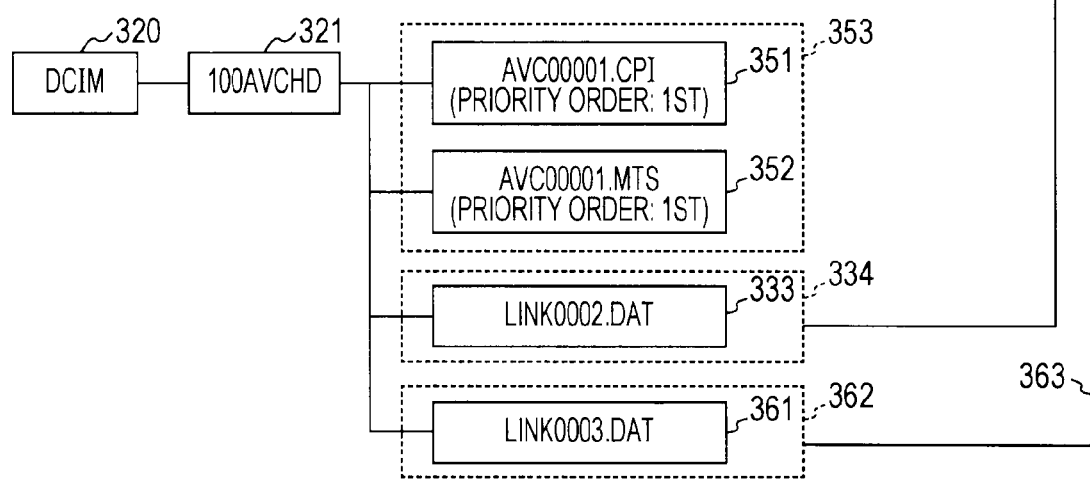

In FIGS. 12A and 12B, a recording example after the recording of three image contents is shown. The example shown in FIGS. 12A and 12B is the same as the example shown in FIGS. 11A and 11B except that the priority order is changed. Therefore, in FIGS. 12A and 12B, the same reference numerals are given to the same constituent elements as those shown in FIGS. 11A and 11B.

As shown in FIGS. 12A and 12B, when the priority order is changed by the priority content setting unit 160, the management scheme of the image contents is changed based on the changed priority order. For example, the contents having the lowest priority order managed in accordance with the management scheme A are compared to the contents having the highest priority managed in accordance with the management scheme B. Specifically, the image contents (the files "00001.CPI" 308 and "00001.MTS" 311), which are the contents having the lowest priority order managed in accordance with the management scheme A, are compared. In addition, the image contents (the files "AVC00001.CPI" 351 and "AVC00001.MTS" 352), which are the contents having the highest priority order managed in accordance with the management scheme B, are compared.

When the priority orders of all the contents managed in accordance with the management scheme A are not lower than the priority of all the contents managed in accordance with the management scheme B, the management scheme is not changed by the change in the priority orders. That is, when all the priority orders managed in accordance with the management scheme A are higher than all the priority orders managed in accordance with the management scheme B or when both contents (the contents to be compared to each other) have the same priority order, the management scheme is not changed by the change in the priority orders.

In the example shown in FIGS. 12A and 12B, the priority order (3rd) of the contents, which are to be compared, managed in accordance with the management scheme A is lower than the priority order (1st) of the contents managed in accordance with the management scheme B. Therefore, the management scheme is changed by the change in the priority order. An example of change of the management scheme is shown in FIGS. 13A and 13B.

Figure 13A:
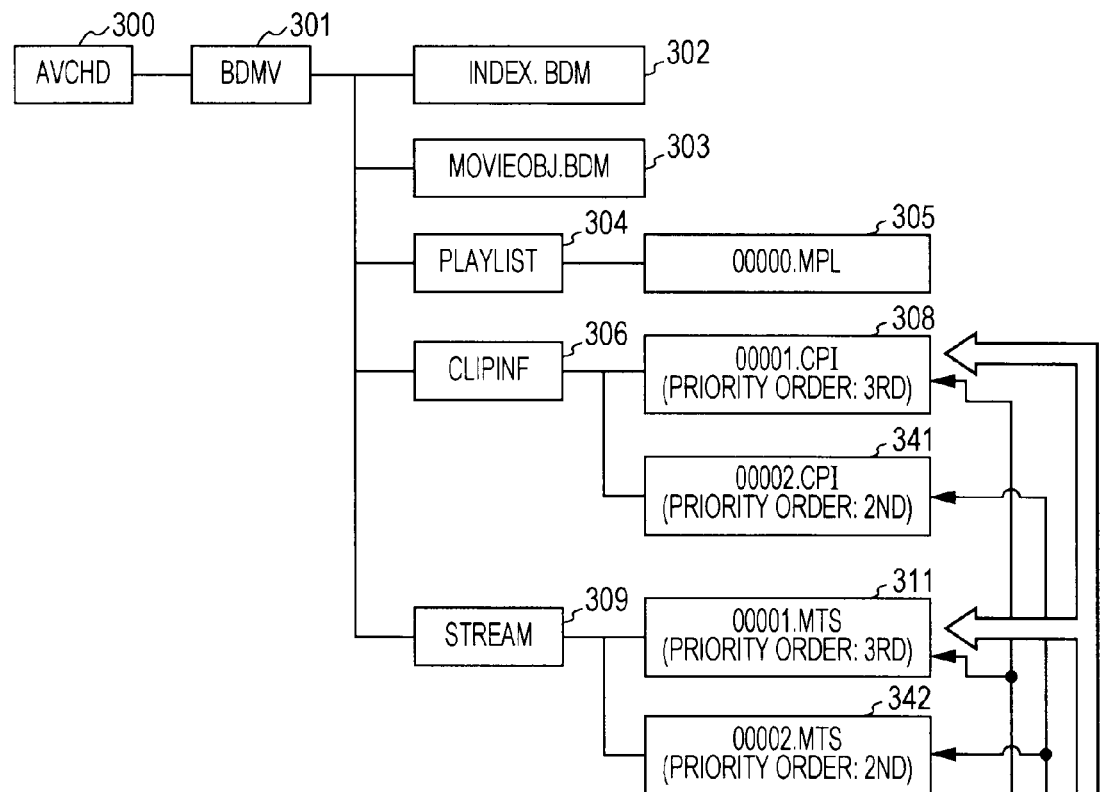
FIGS. 13A and 13B are diagrams schematically illustrating a flow when the content management scheme is changed by the recording control unit according to the first embodiment of the invention.
Figure 13B:
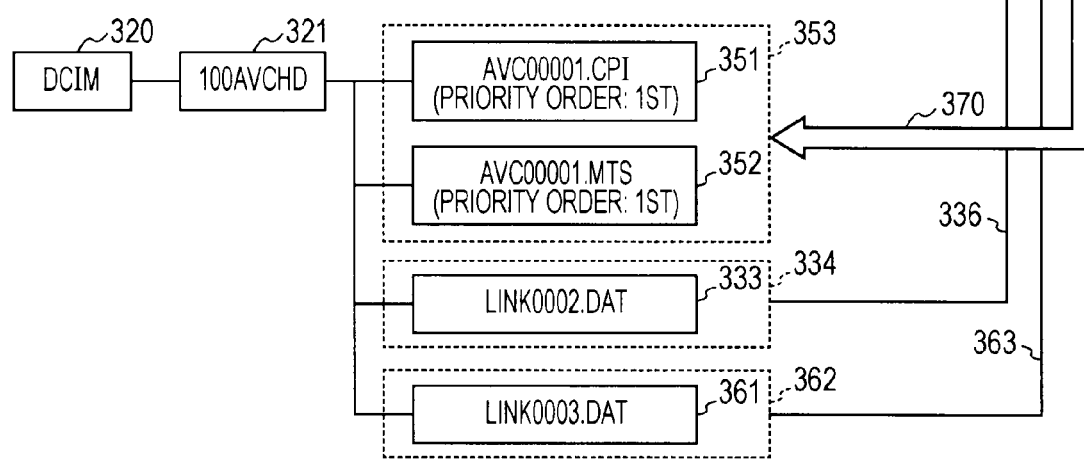

In the examples shown in FIGS. 13A and 13B, the management scheme is changed by changing the priority order after the priority order is changed (as shown in FIGS. 12A and 12B). In FIGS. 13A and 13B, the same reference numerals are given to the same constituent elements as those shown in FIGS. 12A and 12B. Specifically, as indicated by a white arrow 370, the content, which is to be compared, managed in accordance with the management scheme A is interchanged with the content managed in accordance with the management scheme B. That is, when the priorities (priority orders) are reversed to each other, the management schemes of the contents are interchanged with each other.

Figure 14A:
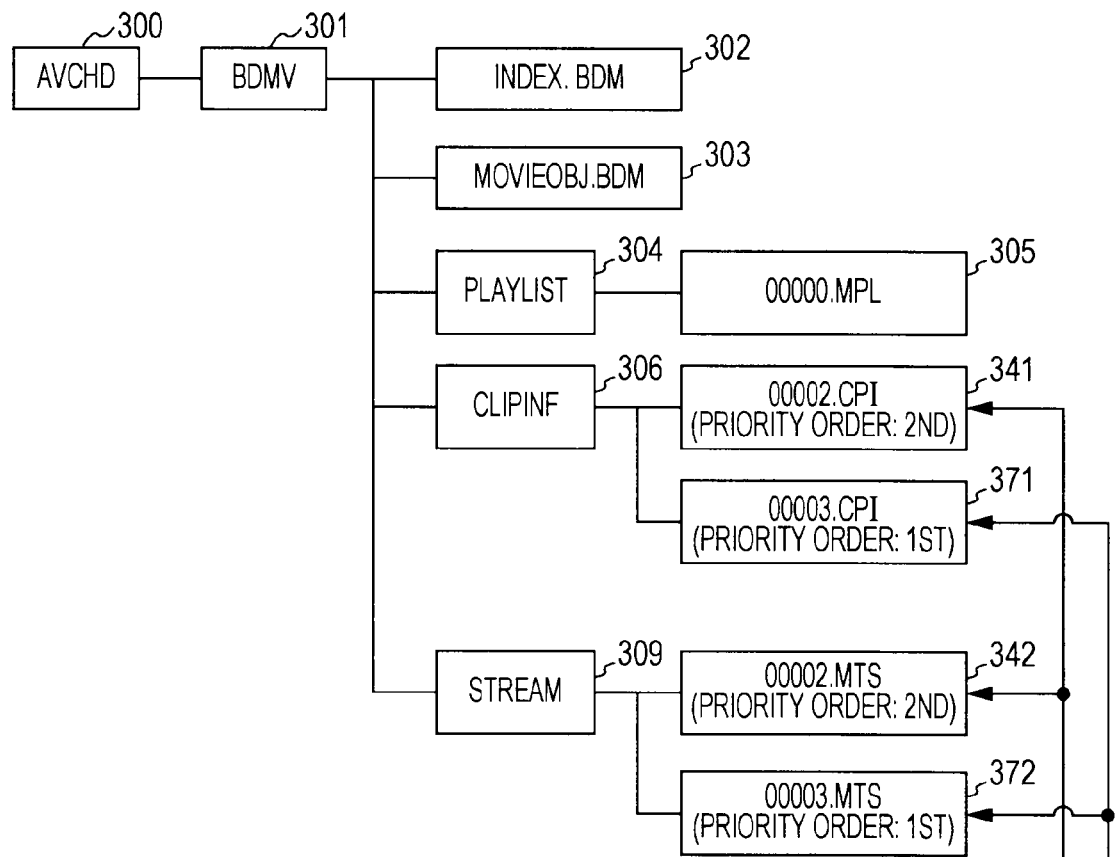
FIGS. 14A and 14B are diagrams schematically illustrating a flow when the content management scheme is changed by the recording control unit according to the first embodiment of the invention.
Figure 14B:
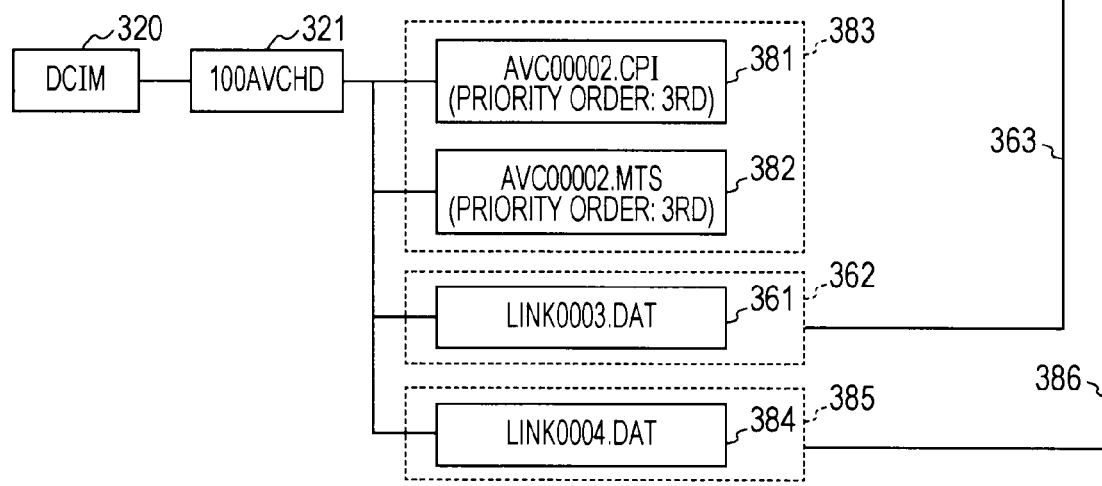

In a recording example shown in FIGS. 14A and 14B, the content, which is to be compared, managed in accordance with the management scheme A and the content managed in accordance with the management scheme B are subjected to a replacement process. In FIGS. 14A and 14B, the same reference numerals are given to the same constituent elements as those shown in FIGS. 13A and 13B.

For example, the link file (the file "LINK0002.DAT" 333) corresponding to the content, which is to be replaced, managed in accordance with the management scheme A is deleted from the management of the management scheme B.

The actual data file of the content, which is to be replaced, managed in accordance with the management scheme A is moved so as to be managed in accordance with the management scheme B. Specifically, the image contents (the files "00001.CPI" 308 and "00001.MTS" 311) managed in accordance with the management scheme A are moved and recorded under the directory "100 AVCHD" 321. In this case, the image contents (the files "AVC00002.CPI" 381 and "AVC00002.MTS" 382 shown in (FIG. 14B)) are recorded under the directory "100 AVCHD" 321. After the movement of the image contents, the image contents (the files "00001.CPI" 308 and "00001.MTS" 311) recorded in accordance with the management scheme A are deleted. In this case, the content information regarding the contents to be replaced is also deleted from the management of the management scheme A. That is, the registration of the content information regarding the contents to be replaced is cancelled from the management of the management scheme A. In the process of cancelling the registration, a maintenance process is performed to match with another file (MPL or BDM) of the AVCHD standard.

The actual data file of the content, which is to be replaced, managed in accordance with the management scheme B is moved so as to be managed in accordance with the management scheme A. That is, the contents (the AV stream file (MTS) and the clip information file (CPI)), which are to be replaced, managed in accordance with the management scheme B are moved so as to be managed in accordance with the management scheme A. Specifically, the image content (file "AVC00001.CPI" 351) recorded in accordance with the management scheme B is moved and the clip information file (file "00003.CPI" 371) is recorded under the directory "CLIPINF" 306. Moreover, the image content ("AVC00001.MTS" 352) recorded in accordance with the management scheme B is moved and the clip AV stream file (file "00003.MTS" 372) is recorded under the directory "STREAM" 309. The files "00003.CPI" 371 and "00003.MTS" 372 are shown in FIG. 14A. Subsequently, content information regarding the contents to be replaced is registered in accordance with the management scheme A. In the registration process, a maintenance process is performed to match with another file (MPL or BDM) of the AVCHD standard.

A link file describing link information regarding the contents to be replaced is recorded in accordance with the management scheme B. Specifically, a link file (file "LINK0004.DAT" 384) is recorded under the directory "100 AVCHD" 321. The recording example after such a recording process is shown in FIGS. 14A and 14B. The link destination corresponding to this link file is indicated by an arrow 386 from a dotted line rectangular shape 385 surrounding a rectangular shape corresponding to the link file.

When there is a plurality of combinations of the contents to be replaced, the process of changing the management scheme is sequentially performed on the plurality of combinations.

Example of Change of Management scheme by Decrease in Contents

FIGS. 15A and 15B to FIGS. 17A and 17B are diagrams schematically illustrating a flow when a content management scheme is changed by a recording control unit 150 according to the first embodiment of the invention. In the examples shown in FIGS. 15A and 15B to FIGS. 17A and 17B, when the number of image contents stored in the recording medium 200 is decreased, the management scheme of the image contents which are not decreased is changed based on the priority order. In FIGS. 15A and 15B to FIGS. 17A and 17B, the priority order of the image content recorded in the recording medium 200 is indicated by a parenthesis within the corresponding rectangular shape. Moreover, in FIGS. 15A and 15B to FIGS. 17A and 17B, in order to facilitate description, it is assumed that the upper limit of the number of contents manageable in accordance with the management scheme A (AVCHD standard) is two.

Figure 15A:
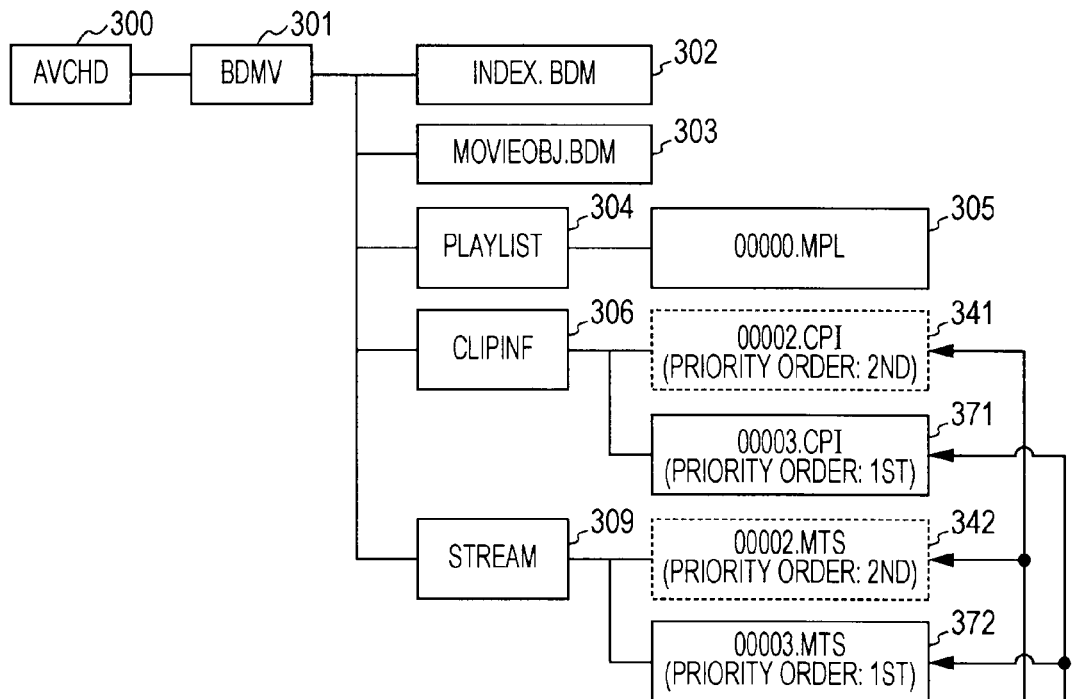
FIGS. 15A and 15B are diagrams schematically illustrating a flow when a content management scheme is changed by the recording control unit according to the first embodiment of the invention.
Figure 15B:
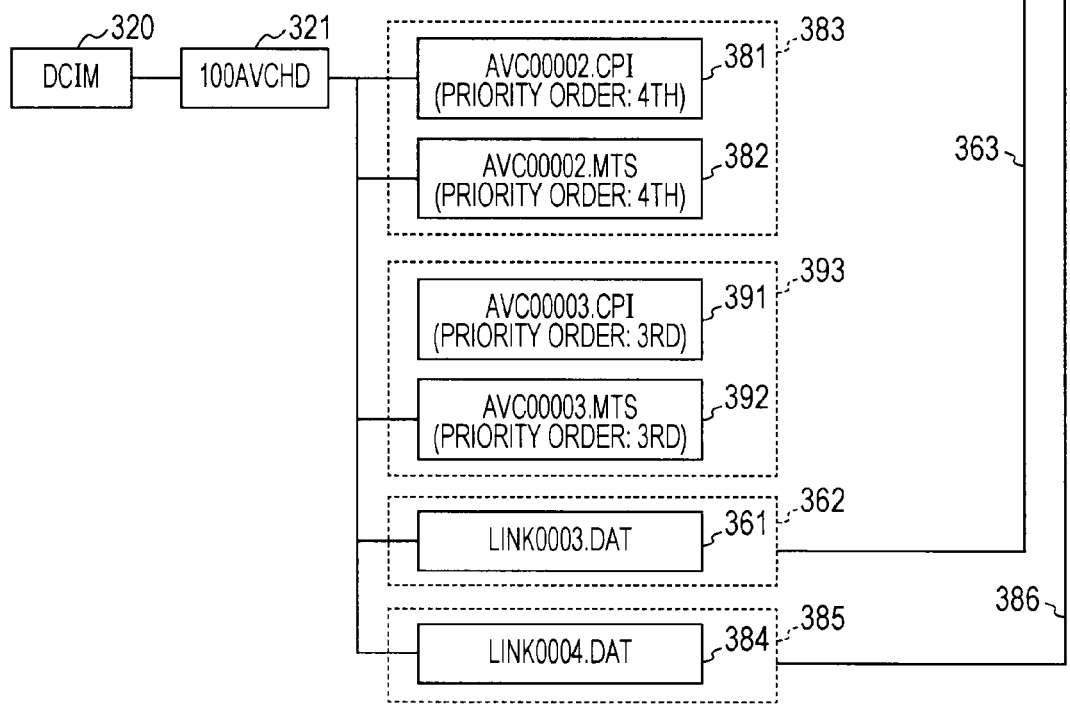

In FIGS. 15A and 15B, a recording example after the recording of four image contents is shown. The example shown in FIGS. 15A and 15B is the same as the example shown in FIGS. 14A and 14B except that one image content (indicated by a rectangular shape 393) is further added than in FIGS. 14A and 14B and the priority orders (indicated by rectangular shapes 383 and 393) of the contents managed in accordance with the management scheme B are changed. Therefore, in FIGS. 15A and 15B, the same reference numerals are given to the same constituent elements as those shown in FIGS. 14A and 14B.

In FIG. 15A, the rectangular shape of the content to be decreased by an operation of decreasing the content is indicated by a dotted line. Specifically, the image contents (files "00002.CPI" 341 and "00002.MTS" 342) are set to the content to be decreased by the operation of decreasing the content. In this example, it is assumed that when a process involving the decrease in the content is performed, both the management scheme A and the management scheme B are maintained in a state where the matching is kept. For example, when the content is deleted in accordance with the management scheme A indicated by the link file, the link file managed in accordance with the management scheme B is also deleted.

Thus, when the content stored in the recording medium 200 is decreased by the operation of decreasing the content, the management scheme of the content which is not to be decreased is changed based on the changed priority order. That is, when the process involving the decrease in the content is performed by an operation of a user, the management scheme of the content is changed. Specifically, when the content to be decrease by the operation of decreasing the content is recorded in accordance with the management scheme A, the management scheme of the image content which is not to be decreased is changed. On the other hand, when the content to be decrease by the operation of decreasing the content is recorded in accordance with the management scheme B, the management scheme is not changed.

In the example shown in FIGS. 15A and 15B, the contents (the files "00002.CPI" 341 and "00002.MTS" 342) to be decrease by the operation of decreasing the content are recorded in accordance with the management scheme A. Therefore, the management scheme of the image content which is not to be decreased is changed. An example of change of the management scheme is shown in FIGS. 16A and 16B.

Figure 16A:
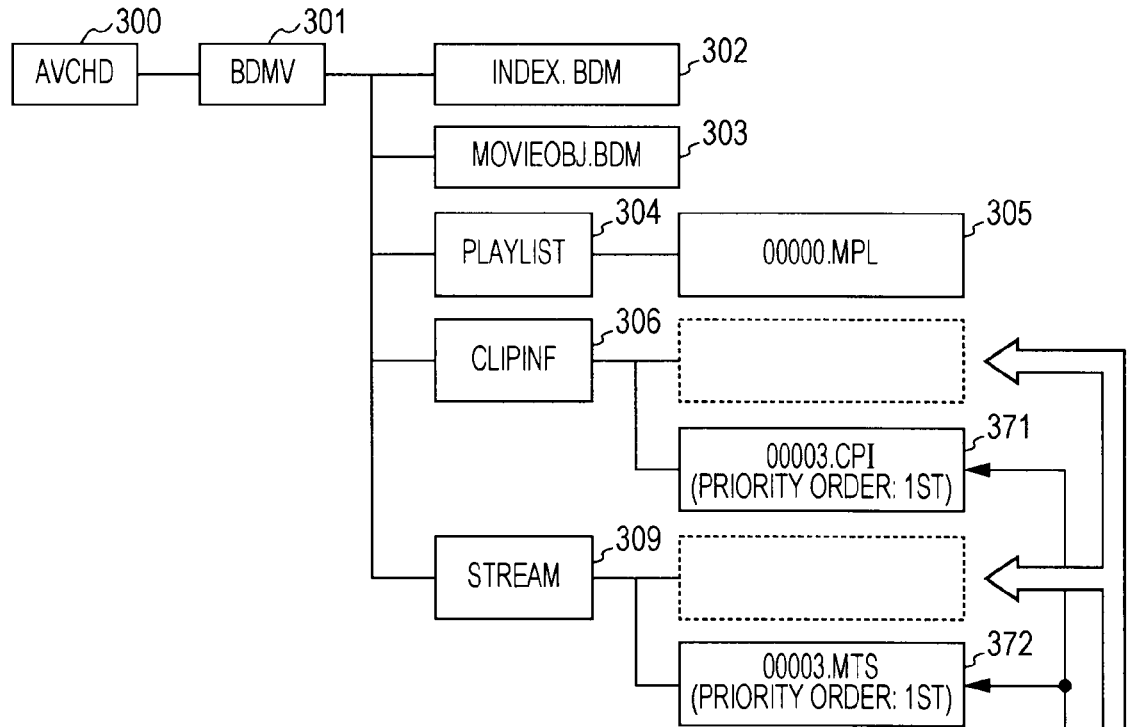
FIGS. 16A and 16B are diagrams schematically illustrating a flow when the content management scheme is changed by the recording control unit according to the first embodiment of the invention.
Figure 16B:
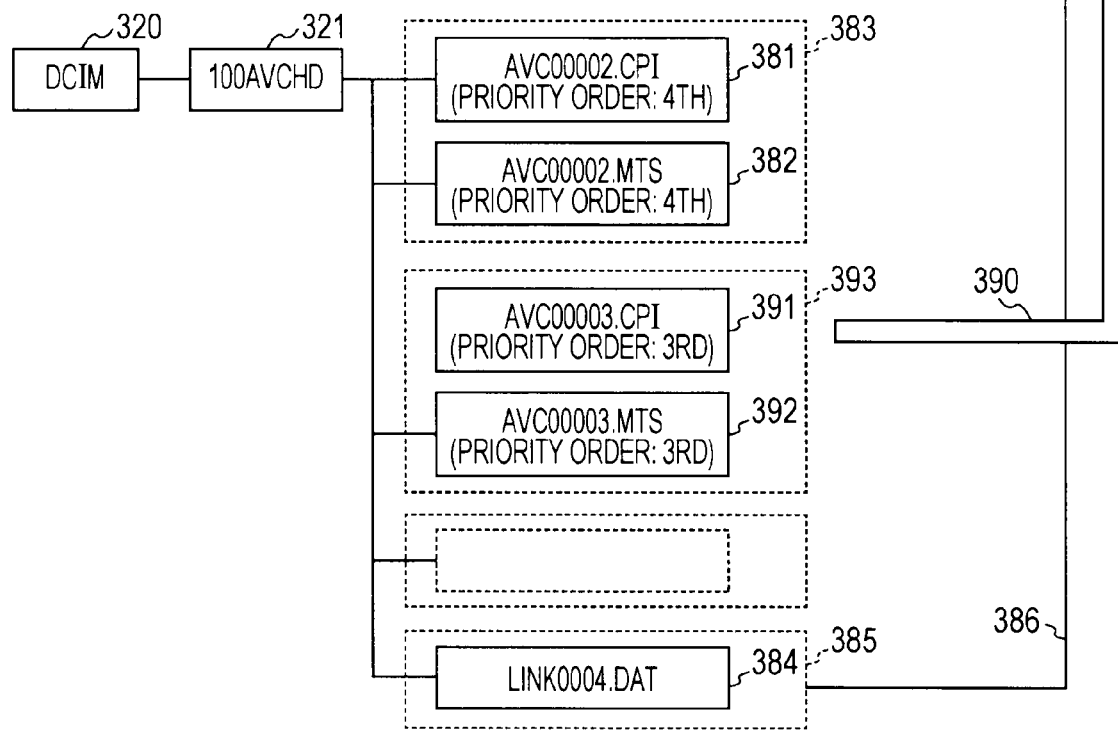

In an example shown in FIGS. 16A and 16B, the management scheme is changed by the decrease in the content after the operation of decreasing the content (as shown in FIGS. 15A and 15B). In FIGS. 16A and 16B, the same reference numerals are given to the same constituent elements as those shown in FIGS. 15A and 15B. Specifically, the content managed in accordance with the management scheme B is moved, as indicated by a white arrow 390.

Figure 17A:
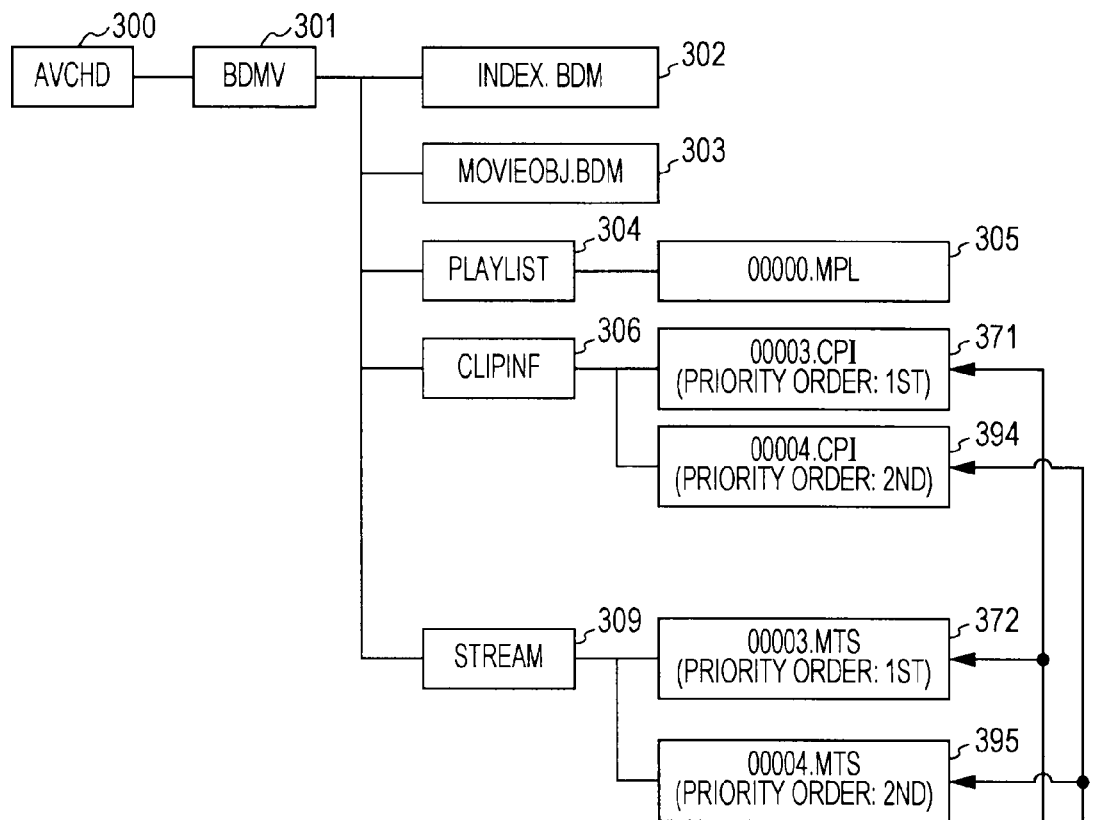
FIGS. 17A and 17B are diagrams schematically illustrating a flow when the content management scheme is changed by the recording control unit according to the first embodiment of the invention.
Figure 17B:
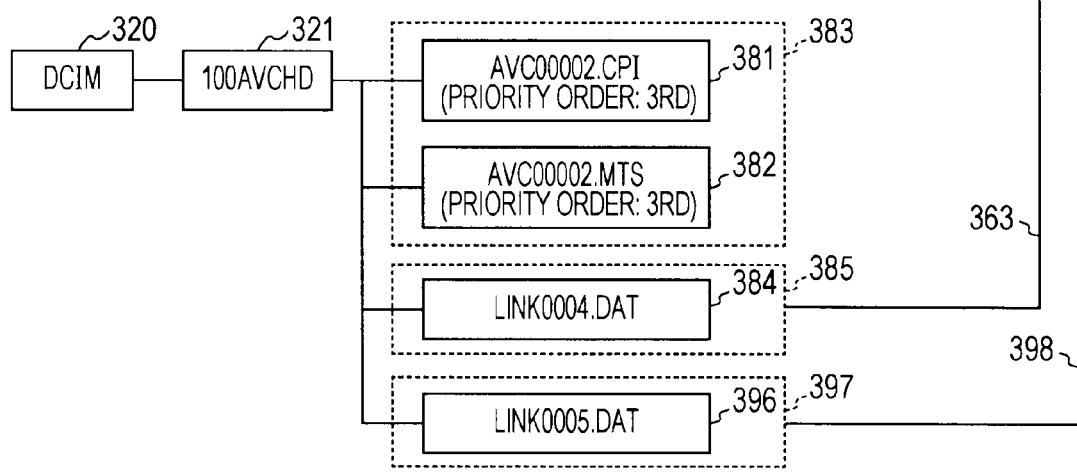

In FIGS. 17A and 17B, a recording example is shown after the content is moved in accordance with the management scheme B. In FIGS. 17A and 17B, the same reference numerals are given to the same constituent elements as those shown in FIGS. 16A and 16B.

For example, the contents having the highest priority order in the management scheme B are selected. Specifically, the contents (files "AVC00003.CPI" 391 and "AVC00003.MTS" 392) having the highest priority order in the management scheme B are selected. Subsequently, the actual data files of the selected contents managed in accordance with the management scheme B are moved so as to be managed in accordance with the management scheme A. That is, the selected contents (the AV stream file (MTS) and the clip information file (CPI)) managed in accordance with the management scheme B are moved so as to be managed in accordance with the management scheme A. Specifically, the image content (the file "AVC00003.CPI" 391) recorded according the management scheme B is moved and the clip information file is recorded under the directory "CLIPINF" 306. The clip information file is a file "00004.CPI" 394. Moreover, the image content (the file "AVC00003.MTS" 392) recorded in accordance with the management scheme B is moved and the clip AV stream file (file "00004.MTS" 395) is recorded under the directory "STREAM" 309. The files "00004.CPI" 394 and "00004.MTS" 395 are shown in FIG. 17A. Subsequently, content information regarding the contents to be moved is registered in accordance with the management scheme A. In this registration process, a maintenance process is performed to match with another file (MPL or BDM) of the AVCHD standard.

A link file describing link information regarding the selected contents is recorded in accordance with the management scheme B. Specifically, a link file (file "LINK0005.DAT" 396) is recorded under the directory "100 AVCHD" 321. The link destination corresponding to this link file is indicated by an arrow 398 from a dotted line rectangular shape 397 surrounding a rectangular shape corresponding to the link file. A recording example after the recording process is shown in FIGS. 17A and 17B. Since the number of contents is decreased by the operation of decreasing the content, the priority orders of the respective contents having the priority order lower than that of the contents to be decreased are changed. For example, the priority order of the content to be moved is changed from 3rd to 2nd and the priority order of the content recorded in accordance with the management scheme B is changed from 4th to 3rd.

When there is the plurality of contents to be decreased, the process of changing the management scheme is sequentially performed on the plurality of contents.

Thus, the contents shared between two content management formats can be rapidly updated automatically according to a specific operation of the user. Here, the specific operation refers to an operation of performing a process, such as photographing or copying, involving addition of contents or a process, such as deleting or editing, involving decrease in the contents. Moreover, the specific operation refers to, for example, an operation of changing the priority order. Thus, even when the content does not increase or decrease, the shared contents may be changed.

Exemplary Process of Imaging Apparatus

Figure 18:
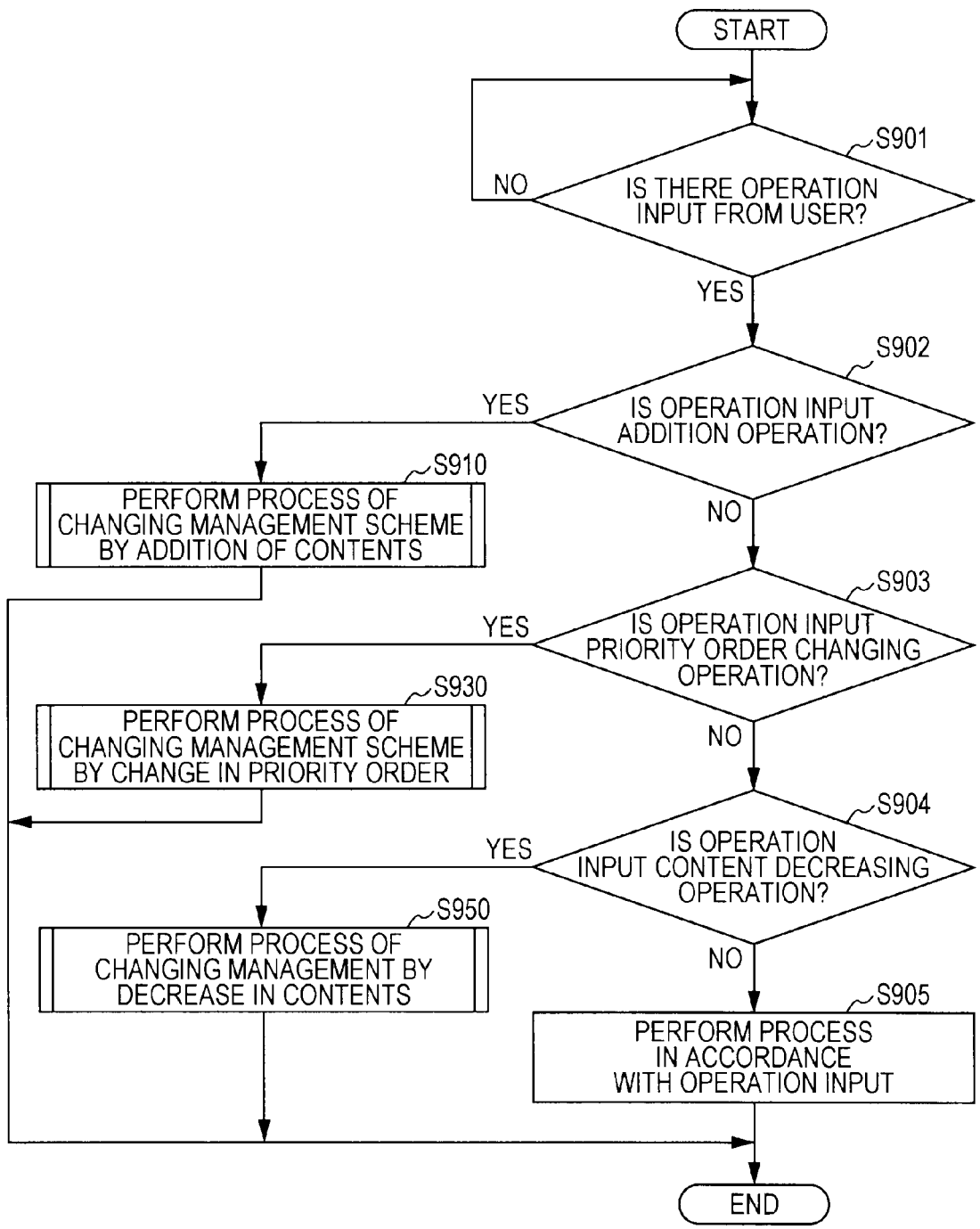
FIG. 18 is a flowchart illustrating an example of a processing sequence of a process of changing the content management scheme by an imaging apparatus according to the first embodiment of the invention.

FIG. 18 is a flowchart illustrating an example of a processing sequence of a process of changing the content management scheme by the imaging apparatus 100 according to the first embodiment of the invention.

Initially, it is determined whether an operation input of a user can be received by the operation reception unit 110 (step S901). When it is determined that the operation input may not be received, monitoring is continuously performed. On the other hand, when it is determined that the operation input may be received (step S901), it is determined whether the operation input is an operation input associated with a specific operation (step S902 to step S904).

That is, it is determined whether the operation input is a content addition operation (step S902). When it is determined that the operation input is the content addition operation, the process of changing the management scheme is performed by addition of the contents (step S910). The process of changing the management scheme will be described in detail with reference to FIG. 19. Here, for example, the content addition operation includes a recording instruction operation (for example, a photographing start operation) of recording image contents (still image contents or video contents) and an operation (for example, a dubbing operation) of inputting contents from an external apparatus.

Then, it is determined whether the operation input is a priority order changing operation (step S903). When it is determined that the operation input is the priority order changing operation, a process of changing the management scheme is performed to change the priority order (step S930). The process of changing the management scheme will be described in detail with reference to FIG. 20. Here, for example, the priority order changing operation includes a determination operation executed on the setting screen 500 shown in FIG. 4A and a determination operation executed on the setting screen 530 shown in FIGS. 6A and 6B.

Then, it is determined whether the operation input is a content decreasing operation (step S904). When it is determined that the operation input is the content decreasing operation, the process of changing the management scheme is performed by decrease in the contents (step S930). The process of changing the management scheme will be described in detail with reference to FIG. 21. Here, for example, the content decreasing operation includes an operation of decreasing the contents by deleting or editing the contents stored in the recording medium 200.

When the operation input is not the operation input associated with the specific operation (step S902 to S904), a process corresponding to the operation input is performed (step S905) and the process of changing the content management scheme ends. Here, step S902 to step S904 are an example of a determining step described in the claims. In addition, step S910, step S930, and step S950 are an example of a controlling step described in the claims.

Figure 19:
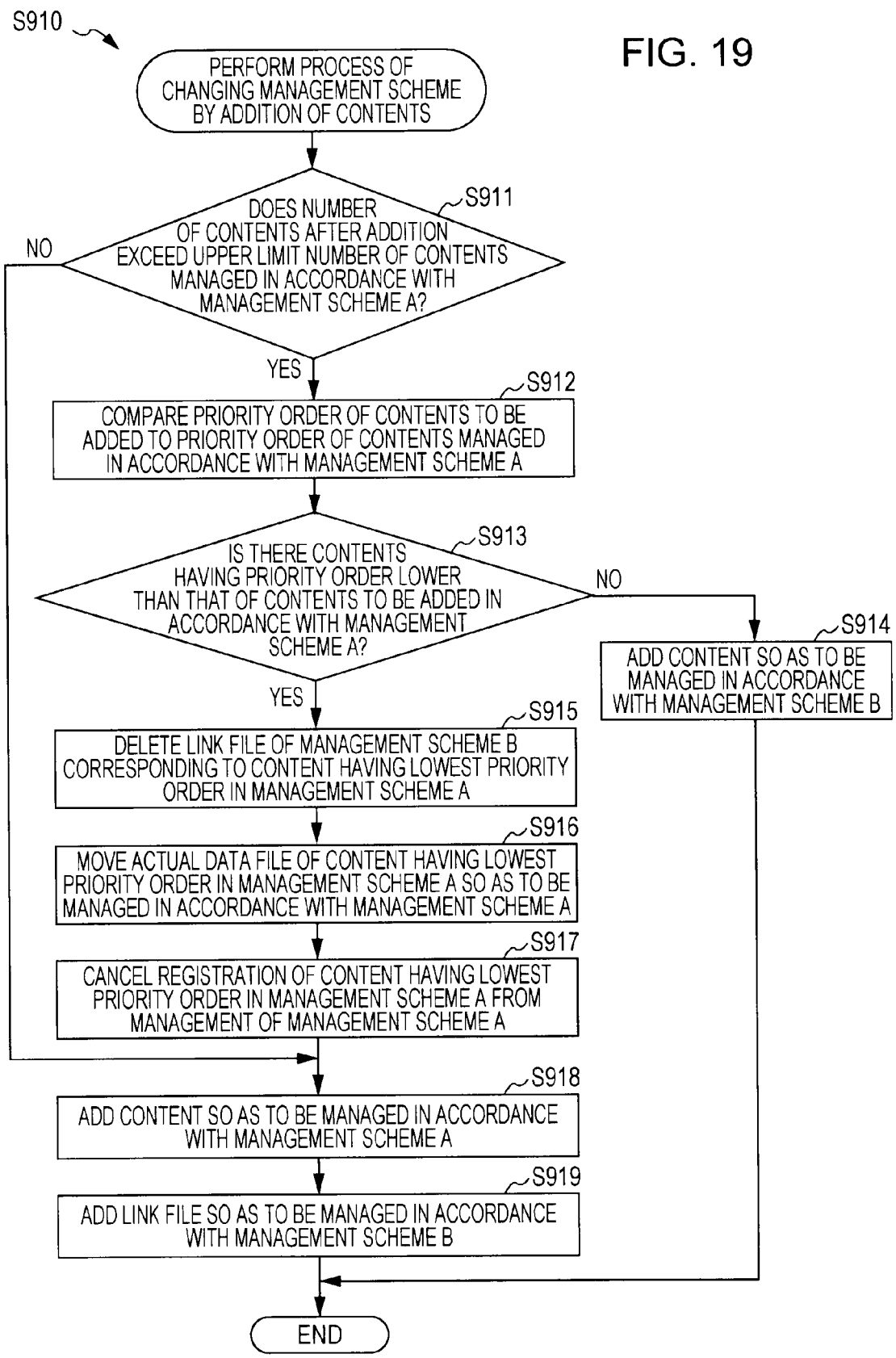
FIG. 19 is a flowchart illustrating an example of a process of changing the management scheme by addition of the contents in the processing sequence of the process of changing the content management scheme by the imaging apparatus according to the first embodiment of the invention.

FIG. 19 is a flowchart illustrating an example of the process (processing sequence of step S910 shown in FIG. 18) of changing the management scheme by addition of the contents in the processing sequence of the process of changing the content management scheme by the imaging apparatus 100 according to the first embodiment of the invention.

Initially, it is determined whether the number of contents (the number of contents stored in the recording medium 200) after performing the addition process by the content addition operation exceeds the upper limit of the number of contents manageable in accordance with the management scheme A (step S911). When it is determined that the number of contents after the addition process does not exceed the upper limit of the number of contents manageable in accordance with the management scheme A (step S911), the contents to be added by the content addition operation are recorded in accordance with the management scheme A (step S918). Subsequently, the link file describing the link information regarding the contents to be added by the content addition operation is recorded in accordance with the management scheme B (step S919).

On the other hand, when it is determined that the number of contents after the addition process exceeds the upper limit of the number of contents manageable in accordance with the management scheme A (step S911), the priority orders of the respective contents including the contents to be added are compared to each other (step S912). That is, the priority order of the content to be added by the content addition operation is compared to that of the respective contents managed in accordance with the management scheme A. Here, for example, when an intention to prioritize the content with a new photographing date is set and a photographing start operation is executed by the content addition operation, the priority order of the content to be added becomes highest (that is, first priority order).

Subsequently, it is determined whether the content having the priority order lower than that of the content to be added is recorded in accordance with the management scheme A from the comparison result of the priority orders of the respective contents (step S913). When it is determined that the content having the priority order lower than that of the content to be added is recorded in accordance with the management scheme A (step S913), the content to be added is recorded in accordance with the management scheme B (step S914).

On the other hand, when it is determined that the content having the priority order lower than that of the content to be added is recorded in accordance with the management scheme A (step S913), the contents having the lowest priority order in the management scheme A are specified. In addition, the link file corresponding to the specified content is deleted from the management of the management scheme B (step S915). Subsequently, the actual data files of the specified contents managed in accordance with the management scheme A are moved so as to be managed in accordance with the management scheme B (step S916). That is, the specified contents (AV stream file (MTS) and the clip information file (CPI)) managed in accordance with the management scheme A are moved so as to be managed in accordance with the management scheme B.

Subsequently, the content information regarding the specified contents is deleted from the management of the management scheme A (step S917). That is, the process of cancelling the registration of the content information regarding the specified contents is performed. In addition, in this registration cancelling process, a maintenance process is performed to match with another file (MPL or BDM) of the AVCHD standard.

Subsequently, the content to be added by the content addition operation is recorded in accordance with the management scheme A (step S918). Subsequently, the link file describing the link information regarding the content to be added by the content addition operation is recorded in accordance with the management scheme B (step S919).

Figure 20:
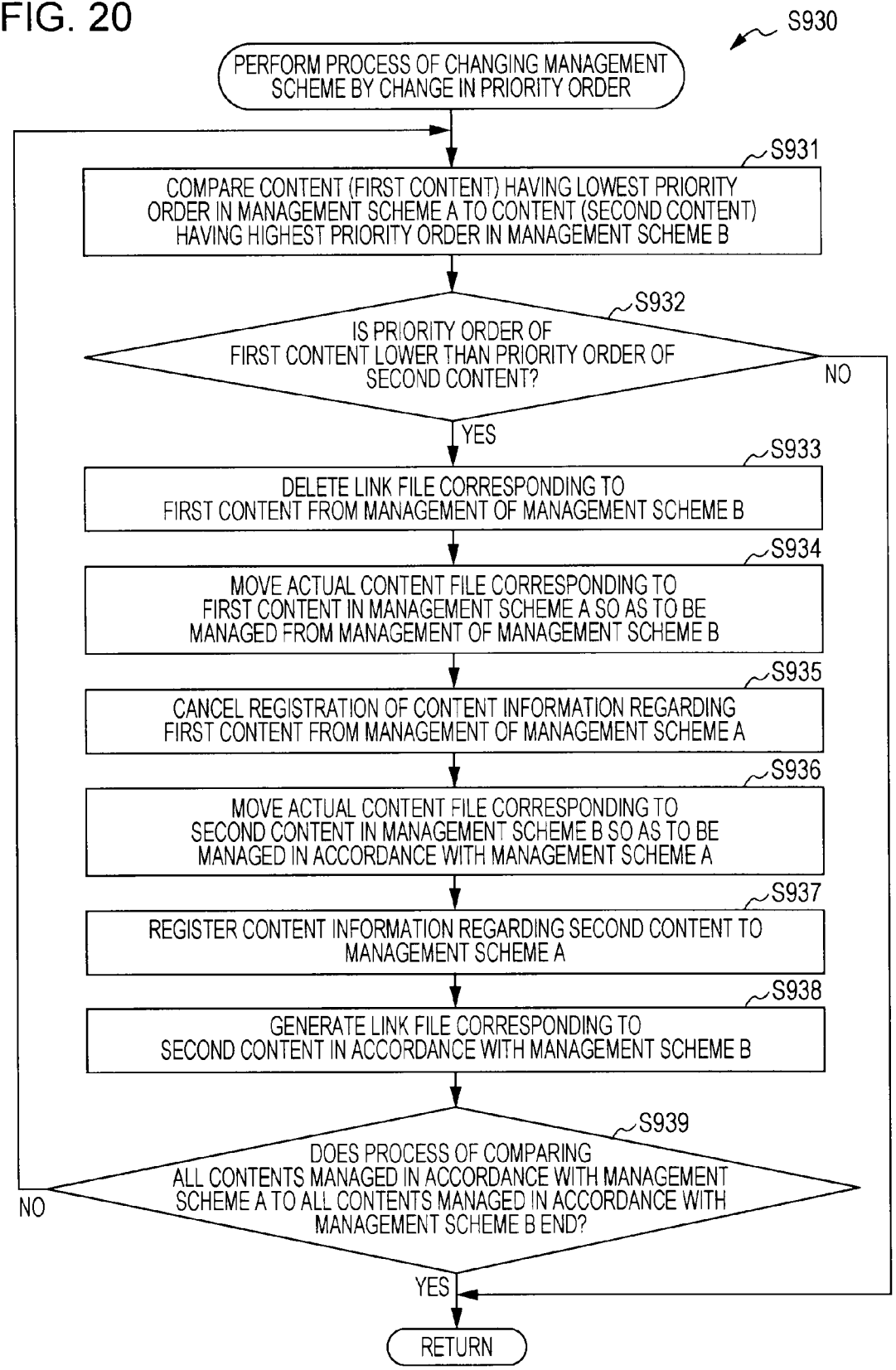
FIG. 20 is a flowchart illustrating an example of a process of changing the management scheme by a change in the priority order in the processing sequence of the process of changing the content management scheme by the imaging apparatus according to the first embodiment of the invention.

FIG. 20 is a flowchart illustrating an example of the process (processing sequence of step S930 shown in FIG. 18) of changing the management scheme by a change in the priority order in the processing sequence of the process of changing the content management scheme by the imaging apparatus 100 according to the first embodiment of the invention.

Initially, the content (hereinafter, referred to as a first content) having the lowest priority order in the management scheme A is compared to the content (hereinafter, referred to as a second content) having the highest priority order in the management scheme B (step S931). It is determined whether the priority order of the first content is lower than the priority order of the second content (step S932). When it is determined that the priority order of the first content is not lower than the priority order of the second content (step S932), the operation of changing the management scheme by the change in the priority order ends. That is, when the priority order of the first content is equal to or higher than the priority order of the second content, the process of changing the management scheme by the change in the priority order is not performed.

On the other hand, when it is determined that the priority order of the first content is lower than the priority order of the second content (step S932), the link file corresponding to the first content is deleted from the management of the management scheme B (step S933). Subsequently, the actual data file of the first content managed in accordance with the management scheme A is moved so as to be managed in accordance with the management scheme B (step S934). That is, the first content (AV stream file (MTS) and the clip information file (CPI)) managed in accordance with the management scheme A is moved so as to be managed in accordance with the management scheme B.

Subsequently, the content information regarding the first content is deleted from the management of the management scheme A (step S935). That is, the process of cancelling the registration of the content information regarding the first content is performed in accordance with the management scheme A. In addition, in this registration cancelling process, a maintenance process is performed to match with another file (MPL or BDM) of the AVCHD standard.

Subsequently, the actual data file of the second content managed in accordance with the management scheme B is moved so as to be managed in accordance with the management scheme A (step S936). That is, the second content (AV stream file (MTS) and the clip information file (CPI)) managed in accordance with the management scheme B is moved so as to be managed in accordance with the management scheme A.

Subsequently, the process of registering the content information regarding the second content is performed in accordance with the management scheme A (step S937). In addition, in this registration process, a maintenance process is performed to match with another file (MPL or BDM) of the AVCHD standard. Subsequently, the link file describing the link information regarding the second content is recorded in accordance with the management scheme B (step S938).

Subsequently, it is determined whether the comparison process ends in which all the contents recorded in accordance with the management scheme A are compared to all the contents recorded in accordance with the management scheme B (step S939). When the comparison process does not end (step S939), the process returns to step S931. When the comparison process ends (step S939), the process of changing the management scheme by the change in the priority order ends.

FIG. 21 is a flowchart illustrating an example of the process (processing sequence of step S950 shown in FIG. 18) of changing the management scheme by decrease in the contents in the processing sequence of the process of changing the content management scheme by the imaging apparatus 100 according to the first embodiment of the invention.

Initially, it is determined whether the content to be decreased by the content decreasing operation is recorded in accordance with the management scheme A (step S951). When it is determined that content to be decreased is not recorded in accordance with the management scheme A (step S951), the process of changing the management scheme by the decrease in the content ends. On the other hand, when it is determined that content to be decreased is recorded in accordance with the management scheme A (step S951), the content (hereinafter, referred to as a first content) having the highest priority order in the management scheme B is selected (step S952).

Subsequently, the actual data file of the first content managed in accordance with the management scheme B is moved so as to be managed in accordance with the management scheme A (step S953). That is, the first content (AV stream file (MTS) and the clip information file (CPI)) managed in accordance with the management scheme B is moved so as to be managed in accordance with the management scheme A.

Subsequently, the process of registering the content information regarding the first content is performed in accordance with the management scheme A (step S954). In addition, in the registration process, a maintenance process is performed to match with another file (MPL or BDM) of the AVCHD standard.

Subsequently, the link file describing the link information regarding the first content is recorded in accordance with the management scheme B (step S955).

Subsequently, it is determined whether the process of changing the management scheme ends by the number of all the contents to be decreased in the management scheme A (step S956). When the process of changing the management scheme does not end, the process returns to step S952. On the other hand, when the process of changing the management scheme ends (step S956), the process of changing the management scheme by the decrease in the content ends. That is, since the process of deleting the plurality of contents is sometimes performed simultaneously in the content decreasing operation, the process of changing the management scheme is performed on the plurality of contents.

2. MODIFIED EXAMPLES

In the above description, the link file recorded in accordance with the management scheme B is generated and recorded for each of the contents managed in accordance with the management scheme A. In modified examples, the link file is recorded as a fixed file in the DCF directory in accordance with the management scheme B and the link information is not recorded in accordance with the management scheme B. In addition, in the modified examples, the configuration and the like of the imaging apparatus 100 is the same as that of the first embodiment of the invention except that the recording of the link information is different. Therefore, the difference between the modified examples and the first embodiment of the invention will be mainly described and the same description will not be partially repeated.

Figure 22A:
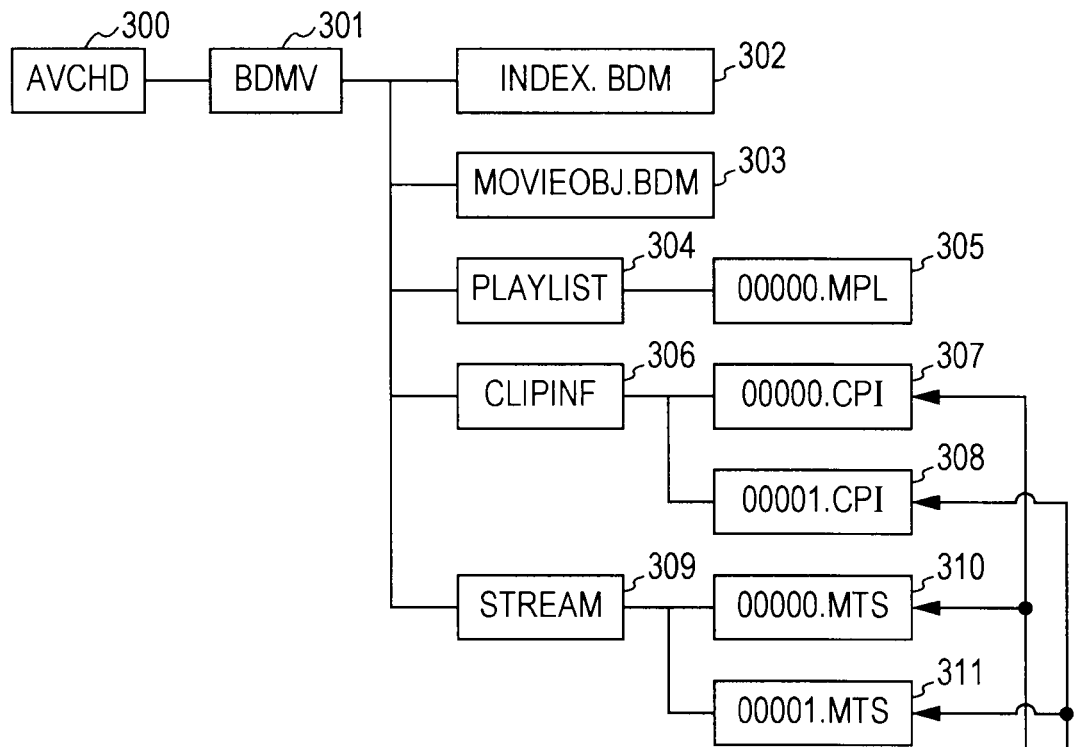
FIGS. 22A and 22B are diagrams illustrating examples of the file structure of image contents stored in the recording medium according to a modified example of the first embodiment of the invention.
Figure 22B:
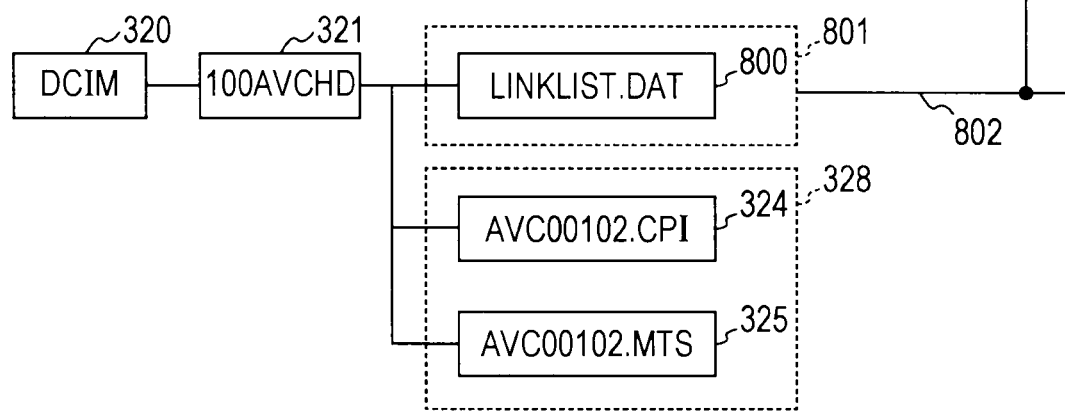

Example of Data Structure of Content Management Format and Example of Management Scheme FIGS. 22A and 22B are diagrams illustrating examples of the file structure of image contents stored in the recording medium 200 according to a modified example of the first embodiment of the invention. In FIG. 22A, an example of the file structure of the image content managed in accordance with the management scheme A is shown. In FIG. 22B, an example of the file structure of the image content managed in accordance with the management scheme B is shown. The examples shown in FIGS. 22A and 22B are modified examples of FIGS. 2A and 2B, respectively. The modified examples are different from the examples shown in FIGS. 2A and 2B in that the link file is recorded as a fixed file in the DCF directory in accordance with the management scheme B. Therefore, the same reference numerals are given to the same elements as those of FIGS. 2A and 2B and the description thereof will not be repeated. Hereinafter, the difference will be mainly described.

A link file "LINKLIST.DAT" 800 is a link file (fixed file in the DCF directory) in which the link information is recorded when the actual data file is managed in accordance with another management format (the management scheme A). A fixed file name "LINKLIST" is used as the file name of the link file and ".DAT" is used as an extension thereof. The link destination corresponding to this link file is indicated by an arrow 802 from a dotted line rectangular shape 801 surrounding a rectangular shape corresponding to the link file. Thus, all of the link information in the DCF directory is collectively recorded in the link file "LINKLIST.DAT" 800.

FIG. 23 is a diagram schematically illustrating a link file stored in the recording medium 200 according to the modified example of the first embodiment of the invention. The example shown in FIG. 23 is a modified example of the example shown in FIG. 3B. In this example, the link file recorded in accordance with the management scheme B is recorded as the fixed file in the DCF directory instead of recording the link file as the DCF object. That is, in FIG. 23, the link file recorded in accordance with the management scheme B is schematically indicated when the actual data file is managed in accordance with another management format (the management scheme A).

In the example shown in FIG. 23, the link file corresponding to the file "LINKLIST.DAT" 800 shown in FIG. 22B is shown.

In accordance with the management scheme B, when the actual data file is managed in accordance with another management format (the management scheme A), the link file recording the link information is recorded in the fixed file of the DCF directory and the relevance of the file is described.

Here, the generation or deletion of the link file in the first embodiment of the invention will be described. According to the first embodiment of the invention, the link file recorded as the DCF object is sometimes generated or deleted in the process of changing the management scheme (the process of changing the management scheme by the addition of the contents). According to this modified example, however, it is not necessary to generate or delete the link file, since the link file is recorded as the fixed file in the DCF directory. Therefore, according to this modified example, the link information is added to the link file (fixed file) instead of generating the link file of the first embodiment of the invention. Likewise, according to this modified example, the link information is deleted from the link file (fixed file) instead of deleting the link file of the first embodiment of the invention. Thus, even when all the link information in the DCF directory is collected in the fixed file of the DCF directory, the process of changing the management scheme can be appropriately performed.

Moreover, even when the link information is not recorded in accordance with the management scheme B, the first embodiment of the invention is applicable. This example is shown in FIGS. 24A and 24B.

Figure 24A:
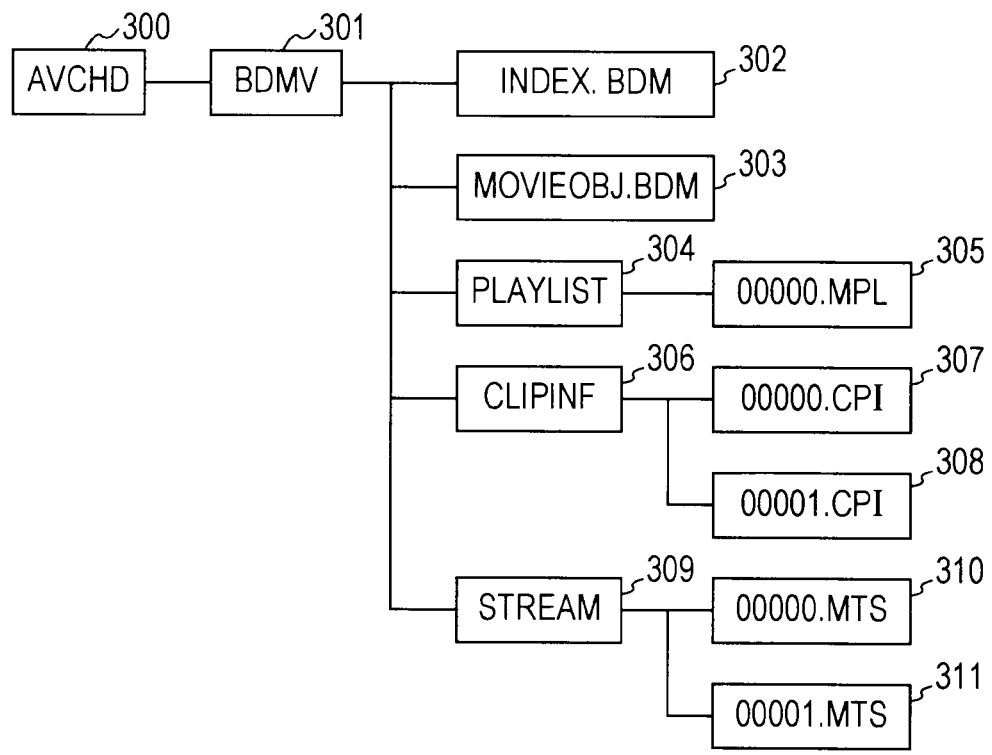
FIGS. 24A and 24B are diagrams illustrating examples of the file structure of image contents stored in the recording medium according to a modified example of the first embodiment of the invention.
Figure 24B:
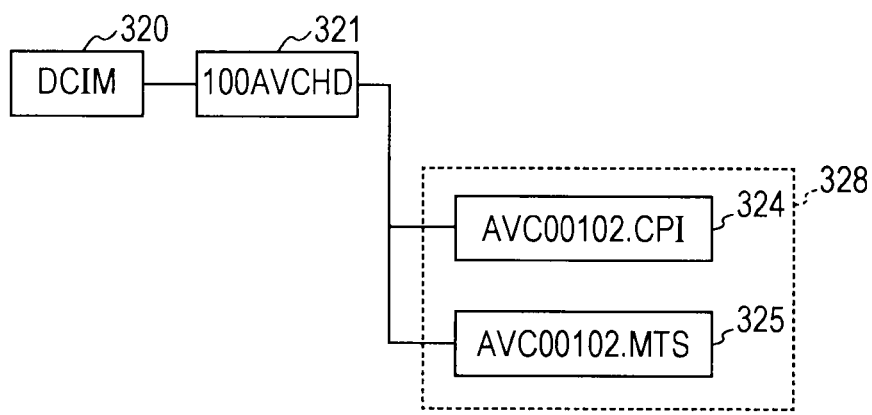

Example of Data Structure of Content Management Format and Example of Management Scheme FIGS. 24A and 24B are diagrams illustrating examples of the file structure of image contents stored in the recording medium 200 according to a modified example of the first embodiment of the invention. In FIG. 24A, an example of the file structure of the image content managed in accordance with the management scheme A is shown. In FIG. 24B, an example of the file structure of the image content managed in accordance with the management scheme B is shown. The examples shown in FIGS. 24A and 24B are modified examples of FIGS. 2A and 2B, respectively. The modified examples are different from the examples shown in FIGS. 2A and 2B in that the link information is not recorded in accordance with the management scheme B. Therefore, the same reference numerals are given to the same elements as those of FIGS. 2A and 2B and the description thereof will not be repeated. Hereinafter, the difference will be mainly described.

Here, the generation or deletion of the link file in the first embodiment of the invention will be described. According to the first embodiment of the invention, the link file recorded as the DCF object is sometimes generated or deleted in the process of changing the management scheme (the process of changing the management scheme by the addition of the contents). According to this modified example, however, it is not necessary to generate or delete the link file, since the link information is not recorded. Therefore, according to this modified example, the process of changing the management scheme can be appropriately performed by omitting the process associated with the generation and the deletion of the link file in the first embodiment of the invention.

Thus, according to the embodiments of the invention, there can coexist two kinds of content management formats: the content management format (the management scheme A) with high compatibility and the content management format (the management scheme B) with the large upper limit of the number of manageable contents. In this case, since important contents (that is, the user's preference contents (the contents having high priority order)) are managed in accordance with the management scheme A, the compatibility (for example, reproduction compatibility with a reproduction apparatus) with other apparatuses can be improved. Moreover, since less important contents (the contents having low priority order) are managed in accordance with the management scheme B in which the upper limit of the number of manageable contents is large, a media capacity can be effectively utilized. That is, when hybrid recording is performed to manage the contents in accordance with the plurality of management schemes, a media capacity can be effectively utilized. Moreover, when the contents are managed in accordance with the plurality of management schemes, the user's preference contents can be appropriately managed.

In the embodiments of the invention, the contents are managed in accordance with two different content management formats (the management schemes A and B). However, even when the contents are managed in accordance with three or more content management formats, the embodiments of the invention is applicable. In this case, for example, the content management format with the highest compatibility can be set as a management scheme of managing the contents (priority contents) having high priority order.

In the embodiments of the invention, the content management format in accordance with the AVCHD standard and the unique content management format in accordance with the DCF standard are used as the two different content management formats. However, even when other content management formats are used, the embodiments of the invention are applicable.

In the embodiments of the invention, the imaging apparatus is used as an example. However, the embodiments of the invention are applicable to an information processing apparatus such as a content management apparatus or a personal computer capable of managing contents stored in a recording medium. Examples of the information processing apparatus include an information processing apparatus having a recording medium storing contents therein or an information processing apparatus on which the recording medium can be mounted.

The embodiments of the invention haven described as examples to realize the invention. As described in the embodiments of the invention, the items of the embodiments of the invention and the inventive specific items of the claims have the correspondence relationship. Likewise, the inventive specific items of the claims and the items of the embodiments of the invention to which the same names as those thereof are given have the correspondence relationship. However, the invention is not limited to the embodiments, but may be modified in various forms of the embodiments within the scope of the invention without departing from the gist of the invention.

In the embodiments of the invention, the processing sequences described in the embodiments of the invention may be understood as the method including the series of sequences or may be understood as a program causing a computer to execute the series of processing sequences or a recording medium storing the program. Examples of the recording medium include a CD (compact Disc), an MD (Mini Disc), a DVD (Digital Versatile Disk), a memory card, and a Blu-ray Disc (registered trademark).

The present application contains subject matter related to that disclosed in Japanese Priority Patent Application JP 2010-129650 filed in the Japan Patent Office on Jun. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a priority content setting unit to set at least one of a plurality of contents managed in accordance with at least one of a plurality of different management formats as priority content based on a selection of a user or a predetermined rule, wherein an upper limit number is predefined for each of the plurality of different management formats, and wherein the upper limit number for each of the plurality of different management formats denotes a maximum number of contents to be managed in accordance with each of the plurality of different management formats; and
a control unit to perform control to change a management format of the priority content to manage the priority content in accordance with a first management format among the plurality of different management formats, when an operation input is received from the user, wherein the operation input is associated with a predefined operation of the image processing apparatus,
wherein the control unit performs control to change a management format of the at least one content not set as the priority content among the plurality of contents and managed in accordance with the first management format, from the first management format to a second management format different from the first management format when a number of contents managed in accordance with the first management format reaches a first upper limit number predefined for the first management format.

2. The information processing apparatus according to claim 1, wherein the predefined operation of the information processing apparatus is one of an operation to add contents managed in accordance with the at least one of the plurality of management formats, an operation to change the priority content, and an operation to decrease the contents managed in accordance with the at least one of the plurality of management formats.

3. The information processing apparatus according to claim 1, wherein when the operation input is associated with the predefined operation of the image processing apparatus, the control unit performs control to change the management format of the priority content to the first management format to manage the priority content when the priority content is not managed in accordance with the first management format, and the control unit performs control not to change the management format to manage the priority content when the priority content is managed in accordance with the first management format.

4. The information processing apparatus according claim 1, wherein the control unit performs control to change the management format of the priority content to manage the priority content so that the priority content is shared between the first management format and the second management format.

5. The information processing apparatus according to claim 1, wherein the plurality of management formats have different upper limits of contents to be managed.

6. The information processing apparatus according to claim 1, wherein the first management format has a reproduction compatibility with a plurality of other apparatuses other than the information processing apparatus.

7. The information processing apparatus according to claim 1, wherein the first management format has a number of contents to be managed less than each of the other different management formats.

8. The information processing apparatus according to claim 1,
   wherein the first management format has a first upper limit management value and a first reproduction compatibility associated therewith, and the second management format has a second upper limit management value and a second reproduction compatibility associated therewith, and
   wherein the first upper limit management value is less than the second upper limit management value, and the first reproduction compatibility is higher than the second reproduction compatibility.

9. The information processing apparatus according to claim 1,
   wherein the priority content setting unit gives a priority order to the plurality of contents based on the selection of the user or the predetermined rule and sets the priority content based on the priority order, and
   wherein a content having a priority above a predetermined value in the priority order is set as the priority content, wherein the priority content having the priority above the predetermined value in the priority order is managed in accordance with the first management format.

10. The information processing apparatus according to claim 9, wherein the control unit performs control to change the management format of the priority content having the priority above the predetermined value in the priority order to the first management format to manage the priority content having the priority above the predetermined value in the priority order when a number of contents managed in accordance with the first management format reaches the first upper limit number.

11. The information processing apparatus according to claim 9, wherein the priority content setting unit determines the priority order based on an attribute of the plurality of contents.

12. The information processing apparatus according to claim 9, further comprising:
   an operation reception unit to receive a designation operation designating an attribute of the plurality of contents to set the priority content, wherein the priority content setting unit determines the priority order based on the designated attribute.

13. An information processing method comprising:
   determining whether an operation input received from a user is associated with a predefined operation;
   performing control to change a management format to manage a priority content in accordance with a first management format among a plurality of different management formats when the operation input is associated with the predefined operation, wherein at least one of a plurality of contents managed in accordance with at least one of the plurality of different management formats is set as the priority content based on a selection of the user or a predetermined rule, and wherein an upper limit number is predefined for each of the plurality of different management formats, and wherein the upper limit number for each of the plurality of different management formats denotes a maximum number of contents to be managed in accordance with each of the plurality of different management formats; and
   performing control to change a management format of the at least one content not set as the priority content among the plurality of contents and managed in accordance with the first management format, from the first management format to a second management format different from the first management format when a number of contents managed in accordance with the first management format reaches a first upper limit number predefined for the first management format.

14. The information processing method according to claim 13, wherein the priority content is user-selected priority content and is managed in accordance with the first management format having a first reproduction compatibility, and the at least one content not set as the priority content is managed in accordance with the second management format having a second reproduction compatibility lower than the first reproduction compatibility.

15. A non-transitory computer-readable storage medium storing computer-readable instructions thereon that, when executed by a computer, cause the computer to perform a method comprising:
   determining whether an operation input received from a user is associated with a predefined operation;
   performing control to change a management format to manage a priority content in accordance with a first management format among a plurality of different management formats when the operation input is associated with the predefined operation, wherein at least one of a plurality of contents managed in accordance with at least one of the plurality of different management formats is set as the priority content based on a selection of the user or a predetermined rule, and wherein an upper limit number is predefined for each of the plurality of different management formats, and wherein the upper limit number for each of the plurality of different management formats denotes a maximum number of contents to be managed in accordance with each of the plurality of different management formats; and
   performing control to change a management format of the at least one content not set as the priority content among the plurality of contents and managed in accordance with the first management format, from the first management format to a second management format different from the first management format when a number of contents managed in accordance with the first management format reaches a first upper limit number predefined for the first management format.

16. The non-transitory computer-readable storage medium according to claim 15, wherein the priority content is user-selected priority content and is managed in accordance with the first management format having a first reproduction compatibility, and the at least one content not set as the priority content is managed in accordance with the second management format having a second reproduction compatibility lower than the first reproduction compatibility.

\* \* \* \* \*